United States Patent
Kobayashi et al.

(10) Patent No.: US 7,828,030 B2
(45) Date of Patent: Nov. 9, 2010

(54) METHOD AND APPARATUS FOR CURING ADHESIVE BETWEEN SUBSTRATES, AND DISC SUBSTRATE BONDING APPARATUS

(75) Inventors: Hideo Kobayashi, Tokyo (JP); Shinichi Shinohara, Tokyo (JP); Hironobu Nishimura, Tokorozawa (JP); Yukio Utsunomiya, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 537 days.

(21) Appl. No.: 11/807,084

(22) Filed: May 24, 2007

(65) Prior Publication Data

US 2007/0227670 A1     Oct. 4, 2007

Related U.S. Application Data

(62) Division of application No. 10/622,357, filed on Jul. 17, 2003, now abandoned.

(30) Foreign Application Priority Data

| Jul. 18, 2002 | (JP) | ............................. 2002-209897 |
| Oct. 22, 2002 | (JP) | ............................. 2002-307283 |
| Oct. 22, 2002 | (JP) | ............................. 2002-307385 |
| Jun. 30, 2003 | (JP) | ............................. 2003-188734 |

(51) Int. Cl.
  *B31B 37/00*     (2006.01)
(52) U.S. Cl. .................................. 156/379.8
(58) Field of Classification Search .................. 156/74, 156/275.7, 295, 379.8, 380.9, 538, 499
See application file for complete search history.

(56) References Cited

U.S. PATENT DOCUMENTS 5,169,675 A    12/1992 Bartoszek-Loza et al.

5,698,305 A    12/1997 Suzuki et al.

(Continued)

FOREIGN PATENT DOCUMENTS

EP    0706178    5/2001

(Continued)

OTHER PUBLICATIONS

English language translation of Japanese Office Action issued in connection with Japanese Patent Application No. 2003-188734, Sep. 5, 2006.

(Continued)

*Primary Examiner*—John L Goff
(74) *Attorney, Agent, or Firm*—Kolisch Hartwell, PC

(57) ABSTRACT

An apparatus for bonding disc substrates is provided with a spinner which spreads adhesive placed between a first substrate and second substrate, and a curing device which radiates ultraviolet light onto the adhesive through the substrate to cure it. The curing device includes; a support mechanism which supports the first substrate and second substrate after the adhesive is spread by the spinner, a semiconductor light emitting apparatus having a plurality of light emitting semiconductor elements arranged facing a region where the adhesive is cured, and a positioning mechanism which positions the semiconductor light emitting apparatus such that the light emitting semiconductor elements are a predetermined distance away from the adhesive. The adhesive is cured or semi-cured by ultraviolet light emitted from the plurality of light emitting semiconductor elements.

2 Claims, 18 Drawing Sheets

U.S. PATENT DOCUMENTS

| | | | |
|---|---|---|---|
| 5,779,855 | A | 7/1998 | Amo et al. |
| 5,785,793 | A | 7/1998 | Arai et al. |
| 5,968,305 | A * | 10/1999 | Maenza .................. 156/272.8 |
| 6,074,482 | A * | 6/2000 | Weber et al. ................ 118/642 |
| 6,108,933 | A | 8/2000 | Vromans et al. |
| 6,231,705 | B1 | 5/2001 | Kanashima et al. |
| 6,294,239 | B1 | 9/2001 | Tokuda et al. |
| 6,309,485 | B1 | 10/2001 | Miyamoto et al. |
| 6,402,880 | B1 | 6/2002 | Ewerlof et al. |
| 6,485,808 | B2 | 11/2002 | Anzai et al. |
| 6,561,640 | B1 | 5/2003 | Young |
| 6,613,170 | B1 | 9/2003 | Ohno et al. |
| 6,730,917 | B2 | 5/2004 | Baggett et al. |
| 2004/0011457 | A1 | 1/2004 | Kobayashi et al. |

FOREIGN PATENT DOCUMENTS

| | | |
|---|---|---|
| EP | 1298653 | 4/2003 |
| JP | 62155965 | 7/1987 |
| JP | 09-153234 | 6/1997 |
| JP | 09-161333 | 6/1997 |
| JP | 9-231625 | 9/1997 |
| JP | 10-097740 | 4/1998 |
| JP | 10128762 A * | 5/1998 |
| JP | 10-334521 | 12/1998 |
| JP | 11-339331 | 12/1999 |
| JP | 11-345433 | 12/1999 |
| JP | 2000-123427 | 4/2000 |
| JP | 2000-268416 | 9/2000 |
| JP | 2001-209980 | 8/2001 |
| JP | 2001283476 A * | 10/2001 |
| WO | WO 99/24977 | 5/1999 |
| WO | WO 00/21082 | 4/2000 |
| WO | WO 00/26029 * | 5/2000 |

OTHER PUBLICATIONS

Machine English language translation of JP 10334521, Feb. 21, 2007.

* cited by examiner

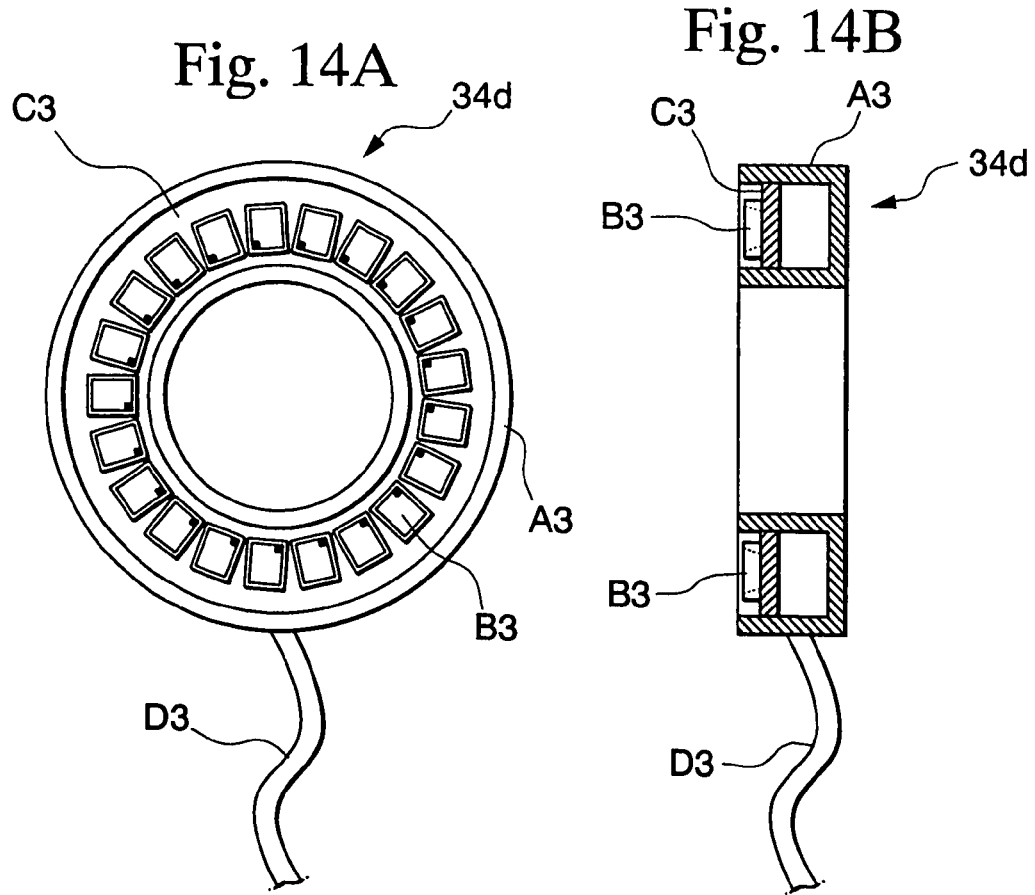
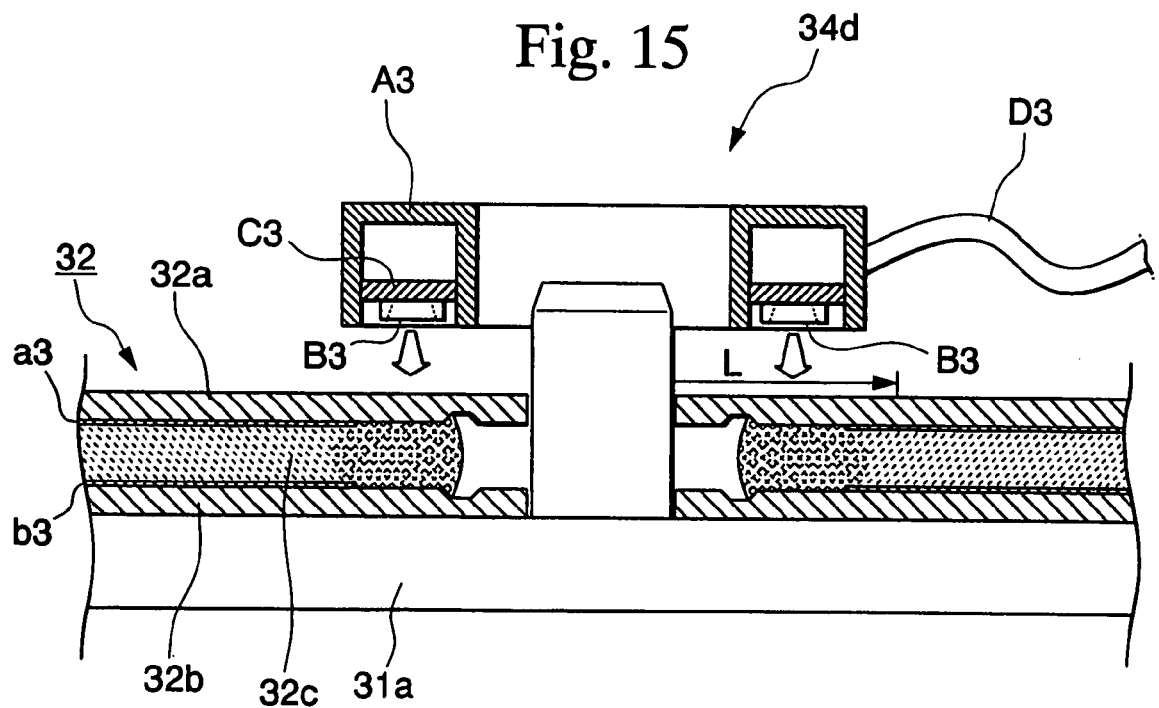

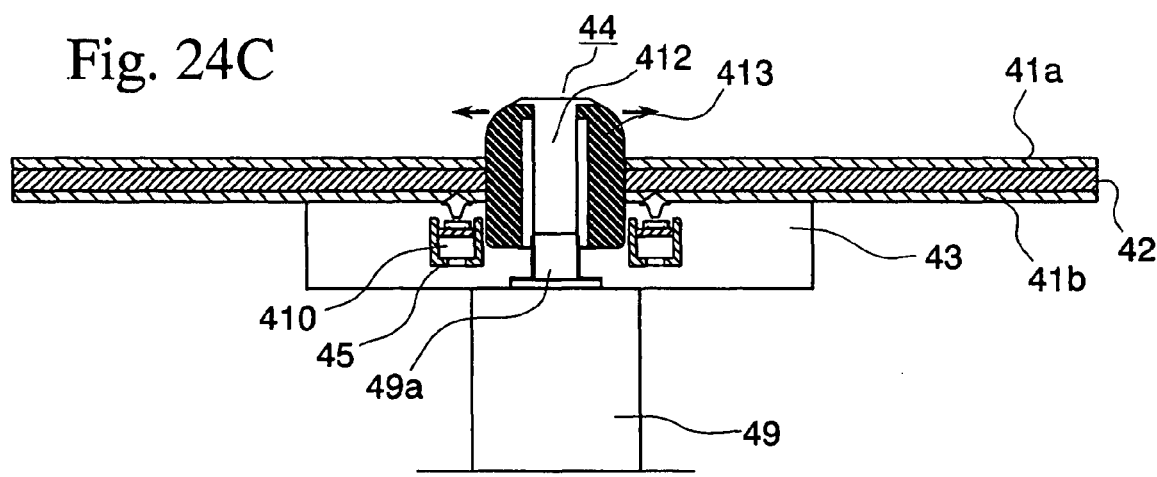
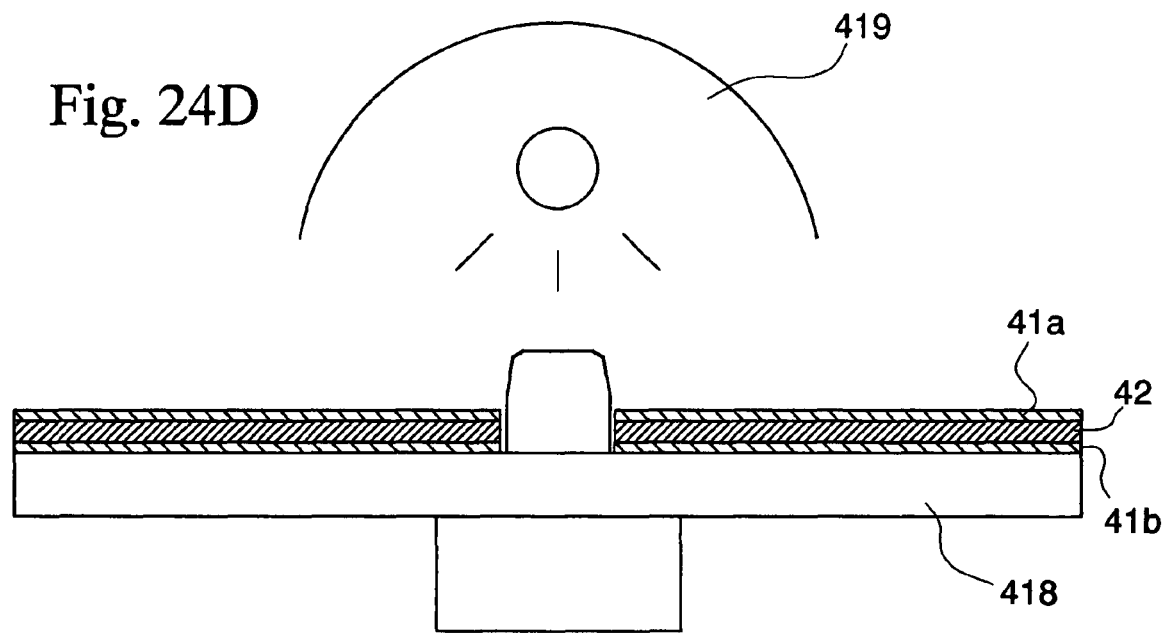

METHOD AND APPARATUS FOR CURING ADHESIVE BETWEEN SUBSTRATES, AND DISC SUBSTRATE BONDING APPARATUS

CROSS-REFERENCE TO RELATED APPLICATION

This application is a divisional application of U.S. patent application Ser. No. 10/622,357 of Hideo Kobayashi, Shinichi Shinohara, Hironobu Nishimura, and Yukio Utsunomiya, filed on Jul. 17, 2003, now abandoned, which is hereby incorporated by reference in its entirety.

BACKGROUND OF THE INVENTION

1. Field of the Invention

The present invention relates to a method and an apparatus for curing adhesive, which are suitable for curing adhesive applied between substrates such as those for optical discs and the like, and an apparatus for bonding disc substrates.

2. Description of Related Art

In general, an optical disc such as a DVD or the like has a structure in which two transparent substrates are bonded together by adhesive. Some of them have a recording layer including a reflective layer or a semi-reflective layer formed on only one of the substrates, and some have recording layers formed on both substrates. In the case where a recording layer is formed on only one substrate, the thickness of the two substrates may be the same, or the substrate on which no recording layer is formed may be formed with a thin, transparent sheet. Some have a structure in which two pairs of substrates are bonded together in a laminate of four substrates. Furthermore, in some cases a plurality of sheets of transparent glass or lenses are bonded to each other via intermediate adhesive.

When manufacturing such an optical disc, after two substrates have been stacked via intermediate adhesive, the adhesive is spread evenly over the substrates by high speed rotation, and excess adhesive is removed. Afterwards, ultraviolet light is normally radiated onto one or both sides of the substrate to cure the adhesive quickly. Regarding the ultraviolet light radiation, ultraviolet light is radiated continuously for a prescribed time using a UV lamp, or pulsed ultraviolet light is radiated using a xenon lamp.

However, the method of curing using these lamps has the following problems.

(1) Since ultraviolet light emitting lamps have low luminous efficiency, and generate significant heat, there is a possibility of the heat distorting the substrates. Furthermore, since a suitable heat dissipation mechanism is required, the size of the apparatus increases, and the cost is high.

(2) Since ultraviolet light emitting lamps are expensive, and their lifetime is short, the running costs are high. Those with a short lifetime must be changed after several tens of hours, which has a detrimental effect on productivity.

(3) In the case of radiating pulsed ultraviolet light, there is an advantage in regard to heat compared with continuous radiation. However, the shock during irradiation is great, so there is a possibility in that vibration during that time may damage the objects to be bonded, such as glass, or have a detrimental effect on adhesiveness. Furthermore, the sound caused by the shocks during irradiation increases the ambient noise level and is not desirable environmentally. In order to solve these problems, conventionally a damping mechanism or a noise control mechanism has been installed. However, this invites a further increase in the size of the apparatus and increases costs.

(4) In the case of lamps, power loss is considerable, so there are disadvantages from both environmental and cost standpoints.

Examples of a conventional DVD manufacturing apparatus and its manufacturing method are described in Japanese Unexamined Patent Application, First Publication No. 2002-245692 (pages 6 to 8, FIG. 1), and Japanese Unexamined Patent Application, First Publication No. 09-231625 (pages 3 to 5, FIG. 1).

In the apparatus described in the references above, adhesive is placed between two disc substrates, the adhesive is spread by a spinner, and the disc substrates are transferred to a pedestal by a transfer mechanism. During this transfer process the adhesive is not cured, and hence there is a possibility in that disc substrates newly bonded together may move. If this happens, they will cure in this state, which causes a drop in quality. Furthermore, there is also a concern that the area around the center hole of the stacked disc substrates may be pulled apart and contaminated by bubbles when the center holes of the disc substrates are mounted on the center pin of a mounting stage in an ultraviolet light irradiating apparatus. Consequently, the uniformity in the tilt and thickness of the completed optical disc is affected, and there is a problem that the quality of the optical disc and the production efficiency deteriorate.

Especially, the uniformity of the tilt and thickness is a major problem for Blu-Ray Disc, which have a very thin, 0.1 mm thick light transmission layer formed from an adhesive layer and a protective sheet, or large capacity optical discs called AOD (Advanced Optical Disc) in which two disc substrates with a thickness of 0.6 mm, which is the same as a DVD, are bonded together, and which require a sufficiently tight tolerance on the thickness of the adhesive film.

In order to solve the above problems, Japanese Unexamined Patent Application, First Publication No. 10-97740 discloses a technique in which disc substrates are transferred after high speed rotation, and the stack of disc substrates is centered, and then cured from above by an emission mechanism moved from a different location, for tacking.

However, this method requires a process in which disc substrates are mounted on a mounting stage for centering, and then a retracted emission mechanism is moved over the disc substrates. Accordingly, operating the apparatus at high speed is difficult, and requires appropriate mechanisms. Furthermore, the inside diameters of the center holes of the disc substrates vary, and hence there is a concern that the inside diameters do not match when the two disc substrates are laminated. Conventionally, when the diameter of a metal member formed from a plurality of blocks is expanded, and applies a pressure to the internal circumferences of the center holes of the disc substrates to center them, a high load is applied to disc substrates with a small inside diameter, which affects the tilt of the disc substrates. Therefore, fine pressure adjustment is difficult.

SUMMARY OF THE INVENTION

A method of curing adhesive between substrates according to the present invention comprises a step for emitting ultraviolet light using a light emitting semiconductor element or a gas laser, and a step for radiating the ultraviolet light onto adhesive spread between first and second substrates through at least one of the first substrate and the second substrate to cure or semi-cure the adhesive.

According to this method, since a light emitting semiconductor element or a gas laser is used, heat generation can be lower than from a conventional lamp, and hence the influence of heat on the substrates can be reduced. Since the lifetime is significantly longer than a lamp, running costs can be reduced. Furthermore, the electrical energy used for the emission is small, so that influences on the environment can be reduced.

The ultraviolet light may have wavelengths in a range where a transmissivity of the adhesive before curing is lower than the transmissivity of the adhesive after curing. In this case, since the transmissivity of the ultraviolet light improves as the adhesive cures, it is possible to cure the adhesive more effectively.

The wavelength of the ultraviolet light may be mainly in a range of 280 to 450 nm. In this case, the influence of heat on the substrates can be reduced, and the transmissivity of the ultraviolet light improves as the adhesive cures. Therefore, it is possible to cure the adhesive more effectively.

A distance between an emission surface of ultraviolet light from the light emitting semiconductor element or the gas laser and an irradiated surface of the substrate may be 10 mm or less. In this case, the influence of heat on the optical disc can be reduced, and the adhesive can be cured more efficiently. More preferably, it is 7 mm or less.

During irradiation by the ultraviolet light, the ultraviolet light and the adhesive may be moved relative to each other. In this case, it is possible to cure the adhesive more uniformly.

A recording layer may be formed on at least one of the first substrate and second substrate, and the ultraviolet light that the light emitting semiconductor element or the gas laser emits may be radiated from the circumference side of the first or second substrates onto the adhesive. In this case, it is possible to cure the adhesive to a more desirable state, and to do it uniformly.

After the adhesive is semi-cured or cured, the substrate may be transferred to a next process, and the adhesive may be cured by irradiation by ultraviolet light. In this case, it is possible to cure the adhesive to a more desirable state. After the adhesive is semi-cured, since the amount of ultraviolet light required to cure the adhesive is small, it is possible to cure the adhesive sufficiently by suitable weak ultraviolet light.

After spreading the adhesive applied between the first and second substrates by high speed rotation, ultraviolet light may be radiated onto it progressively from the internal circumference of the first substrate and the second substrate to the external circumference, while the substrate is rotated slowly, or while the substrate is stopped. In this case, it is possible to cure the adhesive more efficiently, and hence enable quality to be improved.

Either one of the first substrate and the second substrate or both may be polycarbonate. In this case, ultraviolet light of a longer wavelength than the wavelength at which the transmissivity of light saturates for polycarbonate may be radiated. In this case, it is possible to cure the adhesive more efficiently, and hence enable the influence of heat on the substrate to be reduced.

The ultraviolet light may be radiated onto the adhesive protruding from between the first substrate and the second substrate in an atmosphere where an oxygen concentration is lower than in air. In this case, it is possible to cure the adhesive protruding from between the substrates more efficiently and more effectively.

A thickness of an adhesive layer between the first and second substrates may be detected, and the ultraviolet light radiated when the thickness reduces to a preset thickness with the high speed rotation. In this case, it is possible to cure the adhesive more efficiently.

The thickness of the adhesive layer between the first and second substrates may be detected, and the ultraviolet light radiated progressively from an area whose thickness is reduced to a preset thickness with the high speed rotation.

A curing apparatus of the present invention radiates ultraviolet light onto an adhesive spread between first and second substrates through at least one of the first substrate and second substrate for curing. This apparatus comprises a support mechanism which supports the first substrate and second substrate, a semiconductor light emitting apparatus having a plurality of light emitting semiconductor elements arranged facing a region where the adhesive is cured, and a positioning mechanism which positions the semiconductor light emitting apparatus such that the light emitting semiconductor elements are a predetermined distance away from the adhesive, and the adhesive is cured or semi-cured by ultraviolet light emitted from the plurality of light emitting semiconductor elements.

According to this apparatus, heat generation is far less than from a conventional lamp, so the influence of heat on the substrates can be reduced. Furthermore, since the lifetime is significantly longer than an ultraviolet light lamp, running costs are reduced, and the electrical energy used for emission is low.

The plurality of light emitting semiconductor elements may be arranged along any of a helical, concentric circular, or polygonal pattern. Furthermore, the plurality of light emitting semiconductor elements may be arranged at random.

The plurality of light emitting semiconductor elements may be arranged in a helical pattern, and the light emitting semiconductor elements may irradiate ultraviolet light from the inside to the outside progressively with time. In this case, it is possible to cure the adhesive more effectively. Furthermore, it is possible to release the stress occurring in the adhesive layer by curing from the internal circumference to the external circumference, and hence the quality of the bonded substrates is improved.

The plurality of light emitting semiconductor elements may be arranged in a concentric circular pattern, and the light emitting semiconductor elements in the concentric circular pattern, which are adjacent in the radial direction, may radiate ultraviolet light onto the adhesive from the inside toward the outside progressively with time.

The light emitting semiconductor elements may be connected in parallel. Alternatively, a predetermined number of them may be connected in series, and then those groups of series connections may be connected in parallel. In this case, it is possible to use a low voltage power supply, and hence the reliability is also improved.

The time duration may be almost the same as the curing time of the adhesive, or it may be longer.

The semiconductor light emitting devices are preferably within 10 mm from the adhesive, and more preferably within 7 mm.

The light emitting semiconductor elements of the curing apparatus may be arranged in one row or a plurality of rows so as to extend from the internal circumference to the external circumference of the substrate, and at least one of the support mechanism and the positioning mechanism may rotate the semiconductor light emitting apparatus and the first and second substrates relative to each other.

The curing apparatus may be provided with a gas blowing mechanism for blowing an inert gas such as nitrogen gas or the like onto the surface of the adhesive where ultraviolet light is radiated.

The light emitting semiconductor elements may be fixed onto a printed substrate, and connected to a conductive pattern formed on the printed substrate.

An apparatus for bonding disc substrates of the present invention is provided with a spinner which spreads adhesive placed between a first substrate and second substrate, and a curing device which radiates ultraviolet light onto the adhesive through the substrate to cure it, wherein the curing device comprises; a support mechanism which supports the first substrate and second substrate after the adhesive is spread by the spinner, a semiconductor light emitting apparatus having a plurality of light emitting semiconductor elements arranged facing a region where the adhesive is cured, and a positioning mechanism which positions the semiconductor light emitting apparatus such that the light emitting semiconductor elements are a predetermined distance away from the adhesive, and the adhesive is cured or semi-cured by ultraviolet light emitted from the plurality of light emitting semiconductor elements.

After the adhesive between the first substrate and second substrate is spread by high speed rotation of the spinner turntable, the ultraviolet light may be radiated onto the adhesive from above the turntable.

When the ultraviolet light is radiated onto the adhesive, the turntable may be rotated.

When the ultraviolet light is radiated onto the adhesive, the turntable may be located above a partition of the spinner.

The curing device may further comprise an emitting device which radiates light onto the adhesive spread by the spinner to semi-cure or cure it for tacking the first substrate and second substrate, and a disc transfer mechanism which transfers the tacked first substrate and second substrate to the curing device.

Tacking may be performed while the spinner is rotating. Tacking may be performed by semi-curing or curing the adhesive in a non-recording region where no recording layer is formed in the internal circumference of the optical disc substrate.

An apparatus for bonding disc substrates of another aspect of the present invention comprises: a spinner that rotates the disc substrates stacked via an adhesive at high speed to spread the adhesive between the disc substrates; a tacking mechanism that radiates light through the disc substrates and starts to cure the adhesive spread between the disc substrates to tack the disc substrates together; a transfer mechanism which moves the tacked disc substrates to another location; and a curing device which cures the adhesive. This apparatus enables high quality discs to be obtained.

The tacking mechanism may radiate light onto the disc substrates mounted on a disc pedestal of the spinner, for tacking.

While the disc substrates are rotating at high speed in the spinner, the tacking mechanism may radiate light onto the adhesive in the non-recording region, which is a region on the disc substrates where no information is recorded, to stabilize an internal circumference of the adhesive layer.

Another aspect of an apparatus for bonding disc substrates comprises: a spinner which rotates the disc substrates stacked via intermediate adhesive at high speed to spread the adhesive between the disc substrates; a transfer mechanism which transfers the bonded disc substrates to a centering location; a centering mechanism, which is positioned at the centering location and has a centering member that is inserted into a center hole of the bonded disc substrates to align the internal circumferences thereof; a tacking mechanism for tacking the disc substrates by radiating light through the centered disc substrates to start curing the adhesive layer between the disc substrates; a transfer mechanism which transfers the tacked disc substrates to a curing location; and a curing device, which is positioned at the curing location and cures the adhesive layer between the disc substrates.

The tacking mechanism may semi-cure or cure the adhesive in a non-recording region, which is a region on the disc substrates where no information is recorded.

The tacking mechanism may semi-cure or cure the adhesive in an information recording region of the optical disc substrates.

The tacking mechanism may emit the light while it is rotated relative to the disc substrates.

The tacking mechanism may be provided with light emitting diodes, a semiconductor laser, or a gas laser, which generates the light.

The tacking mechanism may have a tacking emission mechanism which generates light to start curing the adhesive; an arm member at the end of which the tacking emission mechanism is installed; a vertical direction drive unit which supports this arm member and moves it up and down; and a horizontal direction drive mechanism that can support this vertical direction drive mechanism and move it in the horizontal direction.

The tacking mechanism may radiate light onto the disc substrates mounted on the centering mechanism, for tacking.

An apparatus for bonding disc substrates according to another aspect of the present invention comprises: a spinner which rotates a first and second disc substrate stacked via an adhesive at a high speed to spread the adhesive between the disc substrates; a disc mounting stage which is provided with a centering mechanism that is inserted into a center hole of the disc substrates for which the adhesive has been spread, to align the internal circumferences of the first and second disc substrates; and a disc substrate transfer mechanism which transfers the disc substrates from the spinner to the disc mounting stage, and the disc mounting stage is provided with an emission mechanism which radiates light onto the disc substrates whose internal circumferences are aligned to start curing the adhesive layer between the disc substrates.

Using this apparatus, by providing a disc mounting stage, which has both a centering mechanism and an adhesive curing mechanism, at a separate location from the spinner, it is possible to realize accurate centering after a uniform adhesive layer is created by the spinner rotating at high speed, and to improve the production efficiency, thus enabling high quality optical discs to be obtained. Moreover, it is possible to start curing the adhesive almost at the same time as the accurate centering, so that it is possible to improve the quality and efficiency of producing the optical disc substrates.

The emission mechanism may semi-cure or cure the adhesive on the whole surface or a partial region of the disc substrates. In this case, it is possible to bond or tack the disc substrates efficiently.

The emission mechanism may semi-cure or cure the adhesive in a non-recording region of the disc substrates. By curing the adhesive in the non-recording region in the internal circumference of the disc substrates, it is possible to maintain the partially tacked and centered state. Furthermore, it is possible to adjust the spread of the adhesive in the internal circumference of the disc substrates, thus preventing adhesive from protruding from the internal circumference of the center hole of the disc substrates.

The emission mechanism may have a plurality of light emitting diodes that generates the light. In this case, it is possible to miniaturize the emission mechanism, and reduce power consumption. Furthermore, the lifetime of the emission mechanism is long, and reliability is improved.

The emission mechanism may have an annular ultraviolet light radiating lamp surrounding the centering mechanism. In this case, it is possible to complete the adhesive curing during centering, and a high quality optical disc can be obtained, and at the same time the production efficiency can be improved.

The disc mounting stage may have a cooling medium distribution path for cooling the emission mechanism. In this case, it is possible to prevent the conduction of heat generated by the emission mechanism from affecting the disc substrates. Furthermore, it is possible to prevent the light emitting elements from being damaged.

The centering mechanism may have a shaft which moves up and down inside the center hole of the disc substrates, a drive mechanism which is connected to the shaft, and an elastic body surrounding the shaft, which is put under pressure from above when the drive mechanism lowers the shaft, and expands in a radial direction of the disc substrates, and when the elastic body expands, the elastic force presses against the internal circumferences of the center holes of the first and second disc substrates. In this case, it is possible to apply optimal pressure to the internal circumferences of the center holes of both the first and second disc substrates for accurate centering.

BREEF DESCRIPTION OF THE DRAWINGS

FIG. 14A and FIG. 14B are a plan view and a sectional view of a tacking mechanism.

FIG. 15 is a sectional view to explain the function of the tacking mechanism.

FIG. 24A to FIG. 24D are sectional views to explain an embodiment of a bonding method of the present invention.

DETAILED DESCRIPTION OF THE INVENTION

Hereunder is a description of a plurality of embodiments of the present invention. However, the present invention is not limited to these embodiments and the structures of parts of the embodiments may be replaced with other known structures, and also the structures of the embodiments may be interchanged. Furthermore, the following embodiments use the present invention for bonding disc substrates. However, the present invention is not limited to this, and it can be used for any other application provided the application is to bond a pair of substrates with adhesive.

EMBODIMENT 1

Figure 1:
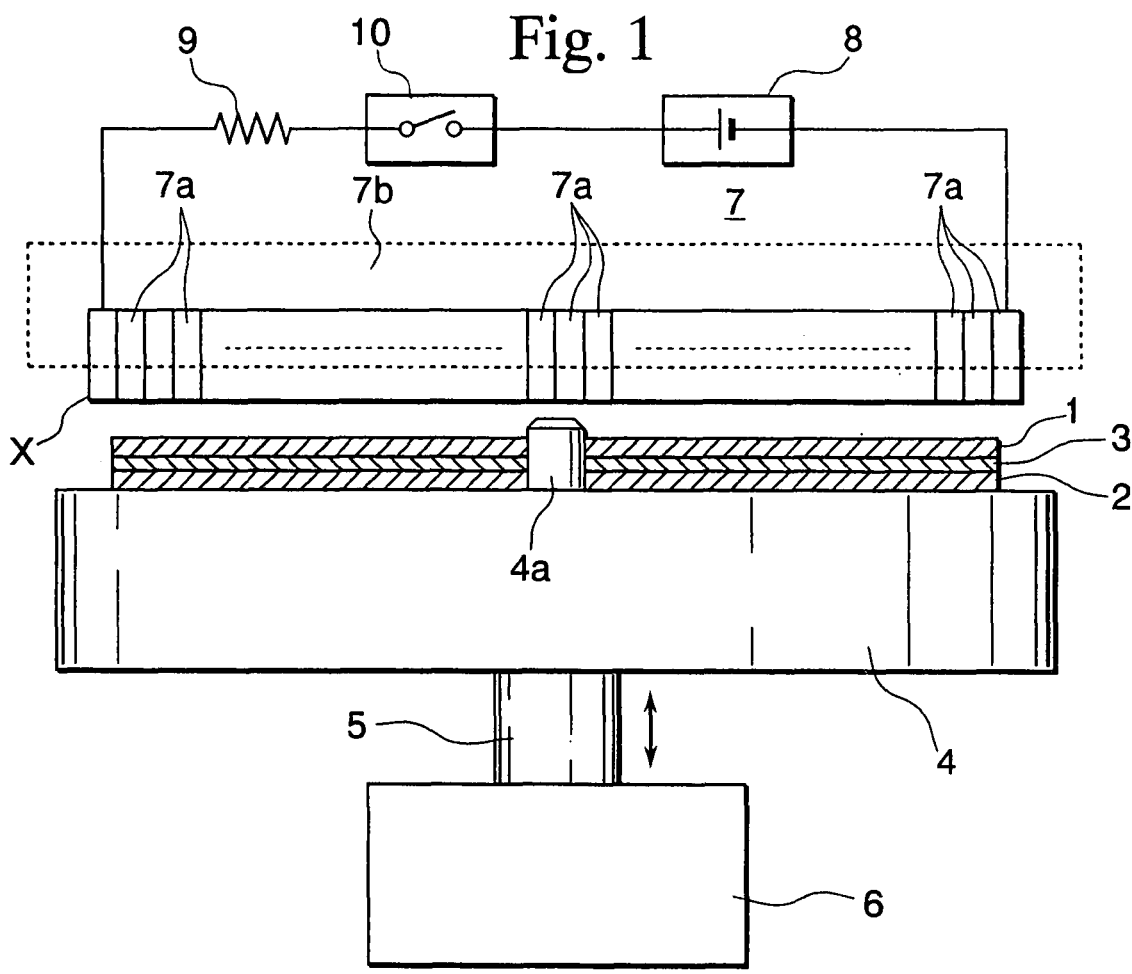
FIG. 1 is a front view showing an embodiment of an apparatus for bonding disc substrates according to the present invention.
Figure 2:
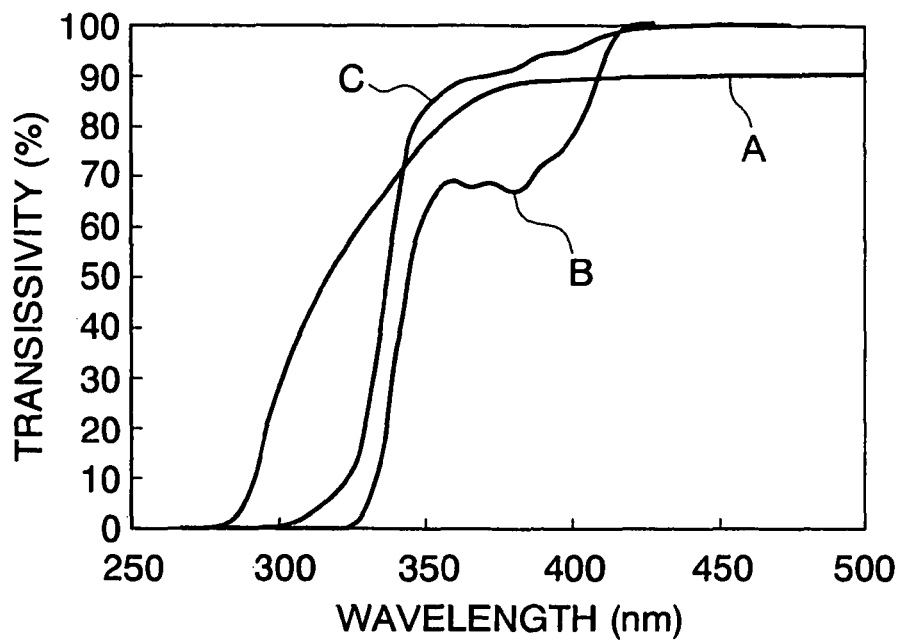
FIG. 2 and FIG. 3 are graphs showing the wavelength and transmissivity of ultraviolet light.
Figure 3:
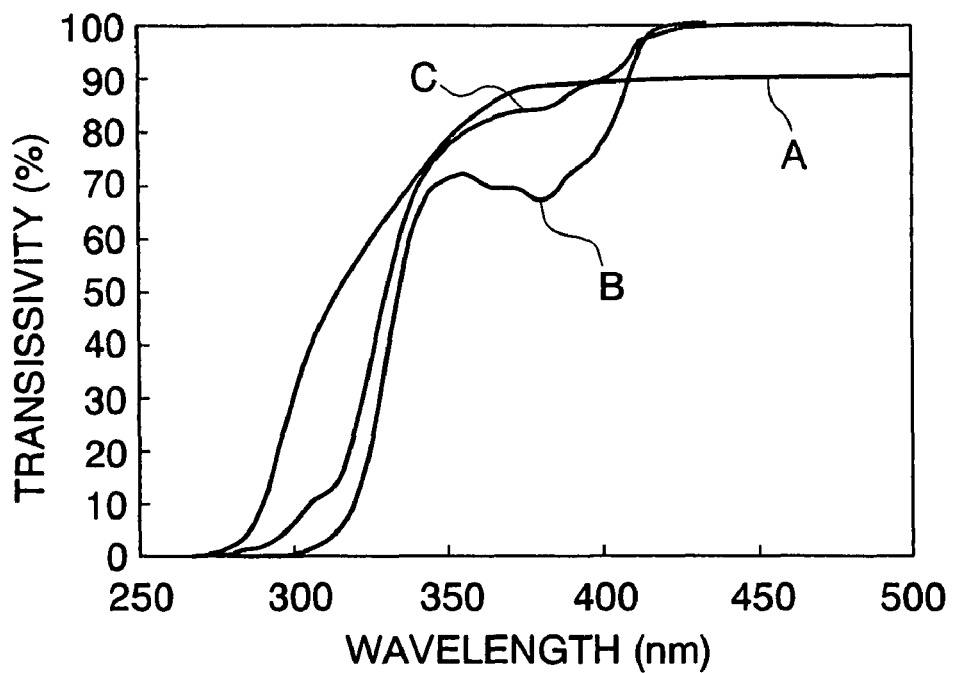

FIG. 1 to FIG. 3 illustrate embodiment 1 of the present invention. In FIG. 1, reference symbols 1 and 2 denote disc shaped substrates such as disc substrates formed from polycarbonate, and an adhesive layer 3 (uncured state) spread by high speed rotation is formed between the substrates 1 and 2. In this example, no recording layer is formed on the substrate 1, and a recording layer including a reflective layer is formed only on the substrate 2. However, recording layers may be formed on both the substrates 1 and 2. In this case, a recording layer including a semi-reflective layer is formed on the substrate 1, and a recording layer including a reflective layer is formed on the substrate 2.

The substrates 1 and 2 are mounted on a flat, disc-shaped pedestal 4, and the pedestal 4 is connected to an elevator unit 6 via an ascending and descending shaft 5. A locating pin 4a is provided in the center of the pedestal 4 for locating the substrates 1 and 2. When the substrates 1 and 2 are mounted, the locating pin 4a is inserted into the center holes of the substrates 1 and 2.

A semiconductor light emitting unit 7 is placed above the uppermost substrate 1 coaxially. The semiconductor light emitting unit 7 has a slightly larger outside diameter than the substrate 1. The semiconductor light emitting unit 7 has a large number of light emitting diodes 7a as light emitting semiconductor elements, and a support 7b for supporting the light emitting diodes 7a. The large number of light emitting diodes 7a is arranged over the whole of the underside of the support 7b, and emission faces X of the large number of light emitting diodes 7a are all on the same plane.

The light emitting diodes 7a may be arranged closely at random. However, it is preferable to arrange them in multiple concentric circles having the same center as the substrate 1. A certain space may be made between adjacent light emitting diodes 7a, or they may touch each other. The light emitting diodes 7a are all connected in parallel, and a resistor is connected in series with each of the light emitting diodes 7a for protection. During physical assembly, surface mount type light emitting diodes and resistors may be surface mounted on a disc shaped printed substrate serving as the support 7b or part of it. Hence it is possible to assemble them easily even if there are about 350 to 450 of each.

One reason why the light emitting diodes 7a are connected in parallel rather than in series is that failure of a light emitting diode 7a may be of a short circuit type or an open circuit type, and if connected in series, emission of the semiconductor light emitting unit 7 may be disrupted if the failure is an open circuit type. Another reason is that since the voltage drop of each light emitting diode is several volts, if 350 to 450 diodes are connected in series, a high voltage of over 1000V is required.

The cathode side of each of the light emitting diodes is connected to the negative terminal of a DC power supply 8, and the anode side thereof is connected to the positive terminal via a protective resistor 9 and a switching device 10. The most simple switching device 10 opens and closes the circuit for a fixed period. The switching device 10 may be equipped with a simple sequencer or a CPU in order to turn a prescribed number of light emitting diodes 7a on and off sequentially. For greater efficiency, each emission surface X of the light emitting diodes 7a is positioned so as to not touch the top surface of the uppermost substrate 1, and the spacing from the surface of the uppermost substrate 1 is as small as possible. This is because light diminishes in proportion to the inverse square of the distance. Preferably the spacing between the emission surface X and the surface of the uppermost substrate 1 is 10 mm or less, and more preferably 1 to 7 mm.

Figure 4:
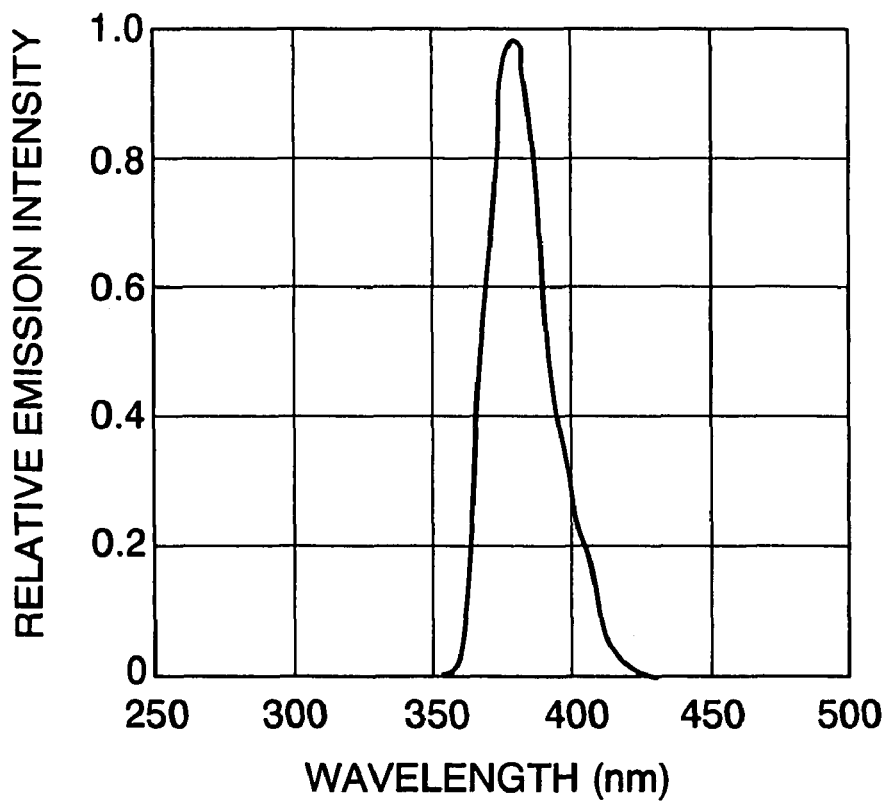
FIG. 4 is a graph showing the emission characteristic of a light emitting diode for ultraviolet light emission.

Preferred characteristics of the light emitting diodes 7a used for this invention are described using FIG. 2 to FIG. 4. In FIG. 2 and FIG. 3, the horizontal axis represents light wavelength, and the vertical axis transmissivity. Curve A shows the transmissivity of a polycarbonate substrate, curve B the transmissivity of adhesive before being irradiated by ultraviolet light, and curve C the transmissivity of adhesive after curing by irradiation by ultraviolet light. Polycarbonate material is used for current optical disc substrates, and the transmissivity of a substrate formed from polycarbonate material increases rapidly when the wavelength is longer than approximately 280 nm. In this embodiment, since ultraviolet light is radiated onto the adhesive 3 through the substrate 1 or 2 of the optical disc to cure it, ultraviolet light whose wavelength is shorter than 280 nm is difficult to use because the transmissivity is low, and hence ultraviolet light with a wavelength of 280 nm or greater, preferably 300 nm or greater, is used, whose transmissivity is high.

As shown in FIG. 2 and FIG. 3, there is a wavelength region where the transmissivity of ultraviolet light through the adhesive is lower before irradiation than after being cured by irradiation. The wavelength region where the transmissivity before irradiation by ultraviolet light from the light emitting diodes is lower than after irradiation is approximately 280 nm to 450 nm, and in this region the transmissivity of the adhesive increases as the adhesive cures by light irradiation. Considering absorption by the adhesive, wavelengths where the absorption rate of ultraviolet light is high are effective for accelerating curing. However, it has been found that even if the adhesive has a high ultraviolet light absorption rate, if the ultraviolet light transmissivity of a substrate made of polycarbonate is too low, the substrate deteriorates. The light wavelength at this time was below 280 nm. Furthermore, it was also found that when sufficient light of wavelengths over 600 nm was radiated for a sufficient time to cure the adhesive, problems occurred such as deterioration or damage to the organic dye film of the optical disc recording layer.

Since the wavelengths when problems occur in the optical disc itself are 280 nm or less, or 600 nm or more, a wavelength region of 280 nm to 600 nm was selected. The results of radiation of light with a range of wavelengths in this wavelength region onto adhesive through a substrate made of polycarbonate confirmed that a photopolymerization reaction of the adhesive occurred when the light wavelength emitted by the light emitting diodes was between 280 nm and 450 nm. Especially when the wavelength of light emitted by the light emitting diodes was between 300 nm and 420 nm, the photopolymerization reaction of the adhesive occurred successfully, and it was also confirmed that there was no detrimental effect on the substrates, the recording layers and the like. The wavelength region of 280 to 450 nm is almost the same as the wavelength region where the transmissivity of ultraviolet light before curing adhesive is lower than the transmissivity of ultraviolet light after curing it.

FIG. 4 shows the characteristics of a commercial ultraviolet light emitting semiconductor element, wherein the horizontal axis represents wavelength, and the vertical axis relative emission intensity. As shown in FIG. 4, the ultraviolet light emitting semiconductor element emits light within a narrow wavelength width, approximately 360 nm to 420 nm, and the peak is at approximately 380 nm. This ultraviolet light at a wavelength of approximately 380 nm is within the desirable wavelength range of 300 nm to 420 nm, so it is clear that this commercial ultraviolet light emitting semiconductor element is suitable as a source of ultraviolet light emission. Accordingly, as a light source for emitting ultraviolet light, it is desirable to use ultraviolet light emitting diodes that emit ultraviolet light with wavelengths as shown in FIG. 4. Almost all light emitted from ultraviolet light emitting diodes that emit ultraviolet light with wavelengths as shown in FIG. 4 can be used for curing the adhesive layer between substrates.

The operation of the apparatus will be described. After the substrates 1 and 2 are joined together via the intermediate adhesive layer 3, the adhesive is spread uniformly by high speed rotation using a typical spinner, which is not shown in the figure. The substrates 1 and 2 are mounted on a substrate pedestal 4 using a typical substrate transfer mechanism, which is not shown in the figure. At the same time, the elevator unit 6 raises an elevator shaft 5, and when the surface of the uppermost substrate comes within a distance of 1 mm to 10 mm, preferably 7 mm, of the emission surface X of the semiconductor light emitting unit 7, the elevator unit 6 is stopped. At the same time as this stops, in other words at the point of time that the surface of the uppermost substrate 1 approaches the predetermined distance within 10 mm of the emission surface X of the semiconductor light emitting unit 7, the switching device 10 operates, current flows from a DC power supply 8 through a switching element, which is not shown in the figure, the protective resistor 9, and all of the light emitting diodes 7a of the semiconductor light emitting unit 7. Thus all of the light emitting diodes 7a emit ultraviolet light mainly in a wavelength range of 280 to 450 nm. The ultraviolet light is radiated onto the adhesive layer 3 through the uppermost substrate 1 to cure the adhesive layer 3. This may be semi-cured. Afterwards, the elevator unit 6 operates again, and lowers the elevator shaft 5, and the substrates 1 and 2 on the substrate pedestal 4 are then removed by the typical substrate transfer mechanism.

Although the light emitted by the light emitting diodes 7a is not strong, the light emitting diodes 7a generate smaller heat, and have less thermal effect on substrates than an ultraviolet light emitting lamp such as a typical xenon lamp. Accordingly, it is possible to reduce the distance between the emission surface X of the semiconductor light emitting unit 7 and the uppermost substrate 1 significantly as described above, compared with the case of using a lamp. Accordingly, it is possible for light from the light emitting diodes of the semiconductor light emitting unit 7 to cure adhesive in approximately the same time as in the case of the conventional lamp.

Furthermore, in this embodiment, the light emitting diodes are arranged closely, so that light from adjacent, surrounding light emitting diodes overlaps. Accordingly, even if one of the adjacent light emitting diodes is damaged, it is possible to reduce the effects to a minimum, and there is no physical, detrimental effect on curing the adhesive.

Furthermore, since the semiconductor light emitting unit 7 is larger than the outer circumferences of the substrates 1 and 2 by one light emitting diode, it is also possible to cure adhesive protruding between the outer edges of the substrates 1 and 2.

In order to cure the adhesive protruding between the substrates 1 and 2 in a short time efficiently, one or a plurality of light emitting diodes, which is not shown in the figure, may be arranged at a location 1 mm to 10 mm away from the circumferences of the substrates 1 and 2 with identical spacing, and light from the light emitting diodes may be radiated onto the adhesive protruding between the substrates 1 and 2 effectively. In this case, it is desirable to rotate the substrates 1 and 2 and the light emitting diodes relative to each other. Normally, the substrates 1 and 2 are rotated. Since the speed for curing the adhesive slows in the presence of oxygen, a gas blowing nozzle for blowing an inexpensive, inert gas such as nitrogen gas may be provided in the location where the light emitting diodes, which are not shown in the figure, radiate, to surround the adhesive to be irradiated with nitrogen gas. In this case, curing of the adhesive in contact with the gas is promoted, and the curing time is reduced.

In this embodiment, the distance between the emission surface X of the semiconductor light emitting unit 7 and the substrates 1 and 2 is narrowed or widened by raising or lowering the pedestal 4a. However, the arrangement may be such that the substrates 1 and 2 are mounted conventionally on a substrate pedestal on a turntable, which is not shown in the figure, and the turntable is rotated in the horizontal direction intermittently or continuously, so that the substrates 1 and 2 pass through a location a predetermined distance below the emission surface X of the semiconductor light emitting unit 7.

In another embodiment of the present invention, ultraviolet light from the semiconductor light emitting unit is radiated onto the adhesive while the substrates 1 and 2 are rotated by a spinner. This embodiment will be described using FIG. 5. However, beforehand, a typical optical disc manufacturing process will be described. In a manufacturing process of an optical disc such as a DVD, adhesive is typically applied to the internal circumference of one substrate in an annular pattern, then the other substrate is stacked on top of it. Afterwards, the stacked substrates are transferred to the spinner by a substrate transfer mechanism, which is not shown in the figure. In the stacking process, a voltage may be applied between the substrates as required to deform the adhesive into a tapered form with the attractive force of the electric field.

Figure 5:
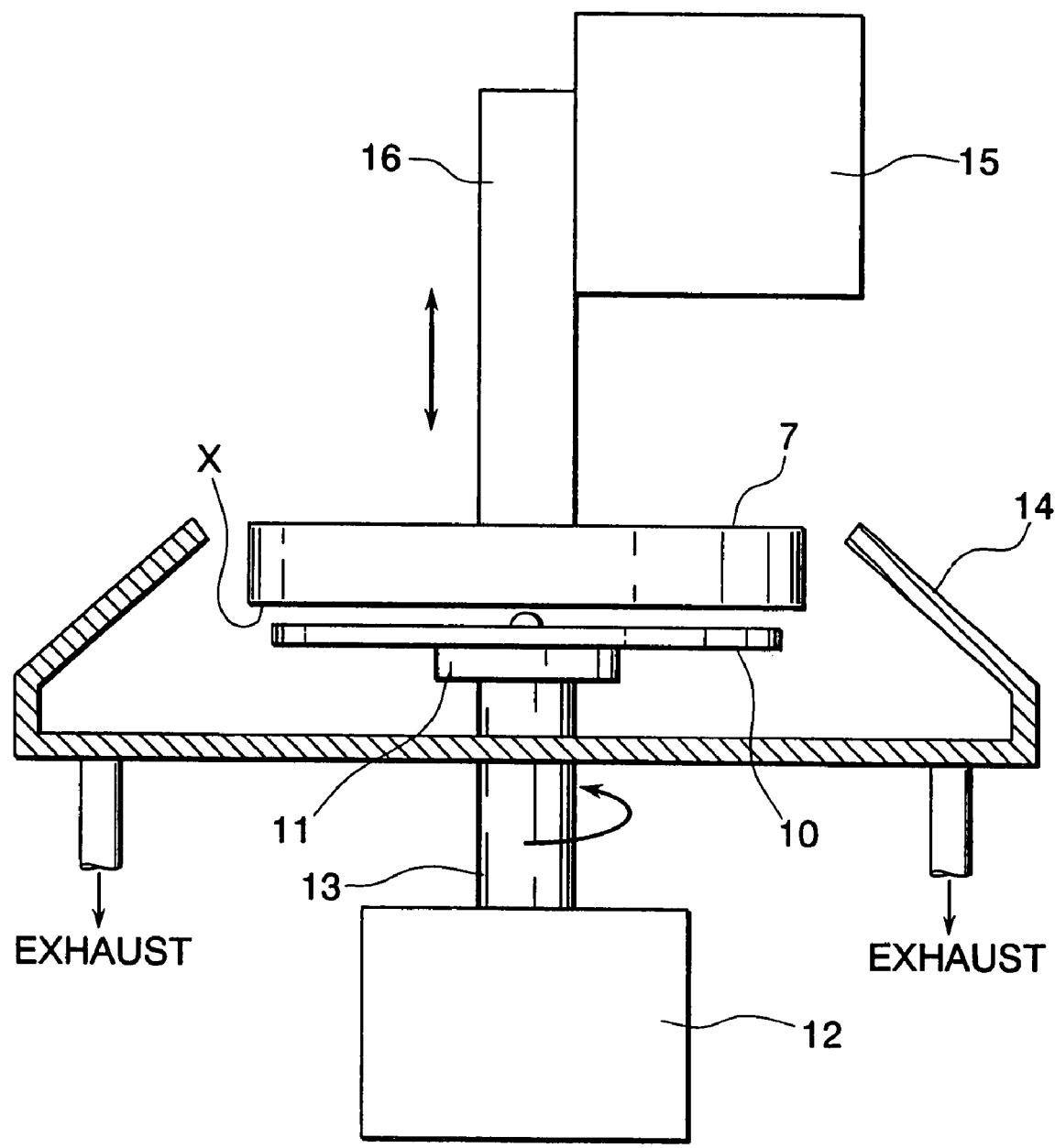
FIG. 5 is a front view, partially cut away, showing an apparatus for bonding disc substrates according to another aspect.

The outline of the spinner is as shown in FIG. 5, and has a turntable 11, which supports a pair of substrates 10 stacked via intermediate adhesive and rotates them, a shaft 13 connecting the turntable 11 with a rotation drive unit 12 such as a motor, and a partition 14 surrounding the area around the substrates 10 on the turntable 11, excluding the above. The spinner generally rotates the substrates 10 at a high rotation speed of 2000 to 6000 revolutions per minute for a predetermined time, thus removing excess adhesive from between the substrates by its centrifugal force, and forms an adhesive layer of a uniform desired thickness. After it stops rotating, the substrates 10 are removed from the spinner by a substrate transfer mechanism, which is not shown in the figure, transferred to an ultraviolet light irradiation mechanism, which is not shown in the figure, and irradiated by ultraviolet light to cure the adhesive between the substrates.

In this embodiment, while the spinner is operating, the semiconductor light emitting unit 7 is placed above the substrates 10. The semiconductor light emitting unit 7 may be the same as in the embodiment described previously. The excess adhesive between the substrates 10 is removed, and when the substrates 10 stop rotating, or at the point of time when the rotation speed slows before rotation stops, the semiconductor light emitting unit 7 is lowered by a vertical motion drive unit 15 and a vertical motion shaft mechanism 16 such that the emission surface X arrives at a location 1 to 10 mm, or preferably 1 to 5 mm, from the surface of the substrates 10. When the emission surface X arrives at the location 1 to 5 mm from the surface of the substrates 10, the semiconductor light emitting unit 7 radiates ultraviolet light with a wavelength range of 280 to 450 nm onto the substrates 10 to cure the adhesive between the substrates. The substrates 10, in which the substrates 1 and 2 are bonded together completely in this manner, are removed from the spinner by the substrate transfer mechanism, which is not shown in the figure.

Ultraviolet light may be radiated onto the substrates 10 while the substrates are stopped. However, in order to achieve uniformity of the amount of ultraviolet light irradiation, it is preferable to radiate ultraviolet light while rotating the substrates 10 at low speed. While the substrates 10 are rotating, ultraviolet light is radiated, and the substrates 10 may stop during irradiation.

In this embodiment, some ultraviolet light, may leak from the semiconductor light emitting unit 7 and cure part of the adhesive attached to the inside of the partition 14 of the spinner. In order to avoid this, the semiconductor light emitting unit 7 is fixed above the spinner, and the substrates 10 may be lifted from the spinner to radiate ultraviolet light onto the substrates 10 from outside the spinner.

In this case, an elevator unit, which moves the shaft 13 and the turntable 11 up and down, is provided in addition to the rotation drive unit 12. In this case, the elevator unit 15 and the elevator shaft 16 are not required to drive the semiconductor light emitting unit 7 up and down. The semiconductor light emitting unit 7 is fixed above the partition 14 of the spinner. In the spinner, when high speed rotation stops, the elevator unit raises the rotation drive unit 12, the shaft 13, the turntable 11 and the substrates 10, and stops them in the vicinity of the semiconductor light emitting unit 7. The semiconductor light emitting unit 7 then radiates ultraviolet light in the aforementioned region onto the substrates 10 to cure the adhesive between the substrates when the surface of the substrates 10 arrives at the location 1 to 7 mm from the emission surface X. By so doing, the adhesive inside the partition 14 is not cured by ultraviolet light. Before the adhesive layer between the substrates cures, if the substrate transfer mechanism, which is not shown in the figure, attracts and holds the surface of the substrates to remove them from the spinner, there is a possibility of detrimental effects occurring such as a slight shift of the substrates, distortion and the like. However, in this embodiment, since the substrates are removed from the spinner after the adhesive layer between them is cured, such detrimental effects do not occur.

Figure 6A:
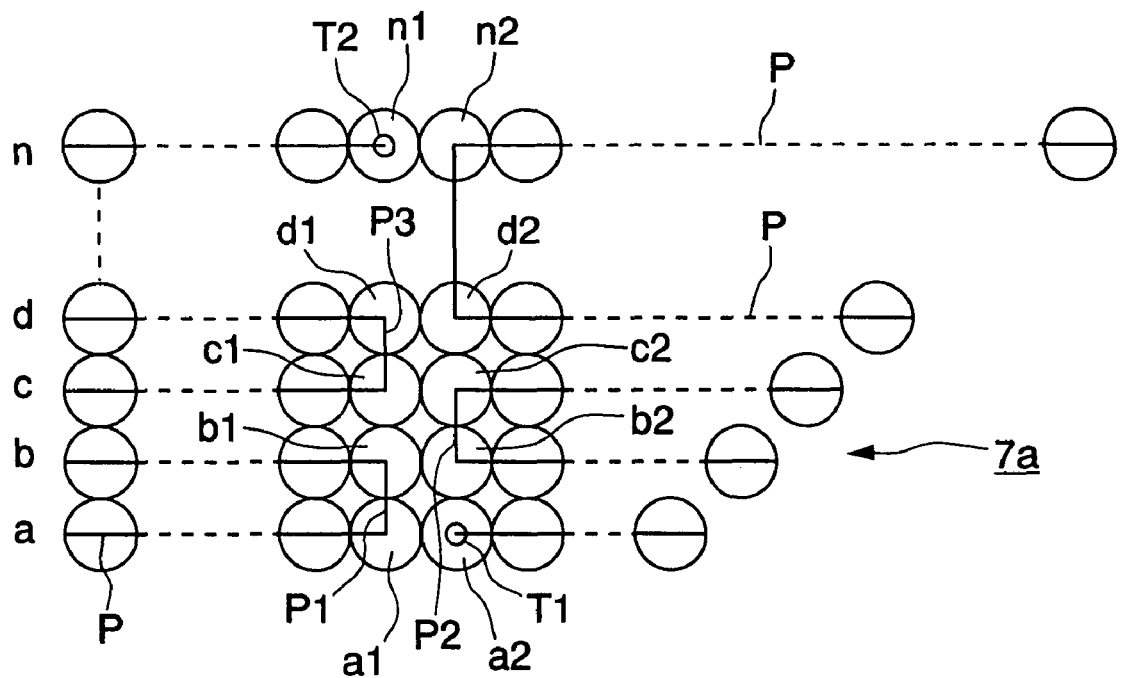
FIG. 6A and FIG. 6B are a plan view and a front view of a semiconductor light emitting unit.
Figure 6B:
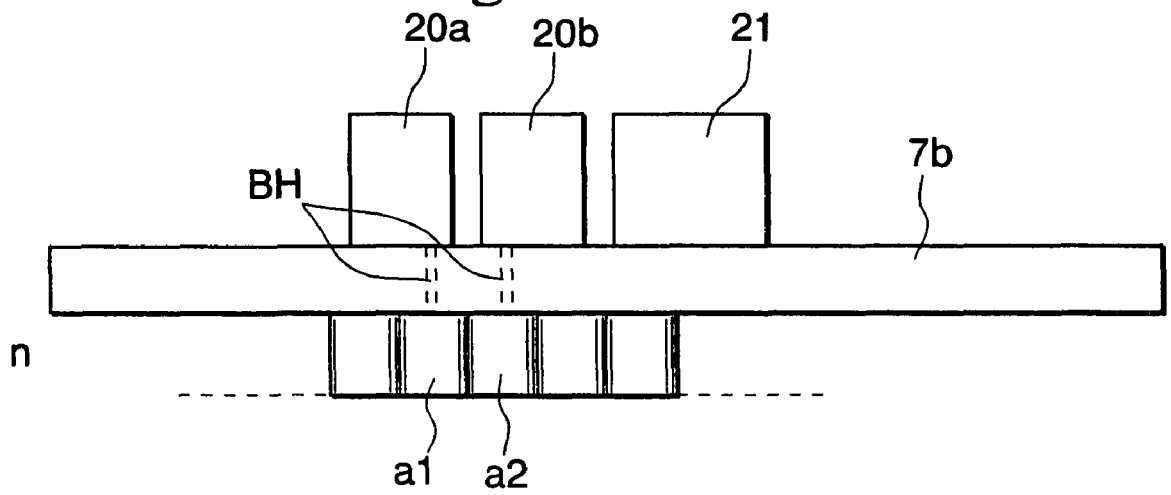

An example of the semiconductor light emitting unit 7 will be described using FIG. 6A and FIG. 6B. FIG. 6A shows an example of an arrangement of light emitting semiconductor elements 7a, wherein the lines a, b, c to n are arranged in concentric circles in the disc shaped support 7b. Line a represents the innermost circle, line b represents the second circle from the inside, and similarly, line n represents the outermost circle. In this embodiment, the support 7b is a disc shaped, printed substrate. Regarding the concentric circular lines a, b, c to n, the light emitting diodes on each of the lines a, b, c to n are all connected in parallel by a conductive pattern P. The innermost line a is connected to line b in series by connecting a light emitting diode a1 to a light emitting diode b1 of line b, which is the next line out, by a conductive pattern P1. Line b and line c, which is the third line from the inside, are connected in series by connecting a light emitting diode b1 and a light emitting diode c1 of line c by a conductive pattern P2. Line c and the fourth line d are connected in series by connecting a light emitting diode c1 and a light emitting diode d1 of line d by a conductive pattern P3. The other adjacent lines are similarly connected in series by conductive patterns. T1 and T2 are input terminals, and when a predetermined voltage is applied to the input terminals T1 and T2, the light emitting diodes of each of the lines a, b, c to n all emit at the same time.

By all of the light emitting diodes of the lines a, b, c to n emitting at the same time, ultraviolet light is radiated onto the whole surface of substrate 1 at the same time, and the whole surface of the adhesive layer 3 is cured at the same time. However, since the adhesive layer 3 is cured by a photopolymerization reaction, a considerable amount of heat occurs at the time of polymerization, and the temperature of the substrates 1 and 2 rises, which may cause distortion. It was found that in order to reduce distortion of the substrates 1 and 2 by reducing heat generation during curing, it is effective for the light emitting diodes to emit in the order of the lines a, b, c to n from the internal circumference side towards the external circumference side.

In order for the lines a, b, c to n to emit in order, a switching element such as a MOSFET is provided between adjacent lines. In this case, switching elements $20a$, $20b$, to $20n$ may be installed between the light emitting diodes a1 and b1, between b2 and c2, and so on to between n-1 and n, respectively, such that they connect between them in series. As shown in FIG. 6B, a drive unit 21 may be installed at the back of the disc shaped, printed substrate $7b$ to switch the switching elements $20a$, $20b$, to $20n$ on and off sequentially. The switching element $20a$ is installed between the light emitting diode a1 and the light emitting diode b1, one end of the switching element $20a$ is connected to the light emitting diode a1 via a through hole BH formed on the printed substrate $7b$, and the other end of the switching element $20a$ is connected to the light emitting diode b1 via another through hole BH formed on the printed substrate $7b$. Similarly, the switching element $20b$ is provided between the light emitting diode b2 and the light emitting diode c2, and one end of the switching element $20b$ is connected to the light emitting diode a2 via a through hole BH formed on the printed substrate $7b$, and the other end of the switching element $20b$ is connected to the light emitting diode c2 via another through hole BH formed on the printed substrate $7b$. Switching elements connected between the other predetermined light emitting diodes are located behind the switching elements $20a$ and $20b$ in FIG. 6B.

The drive unit 21 switches the switching elements $20a$, $20b$ etc. on for a certain time at fixed intervals. Accordingly, all of the light emitting diodes on line a emit first, and after a predetermined time, 20 ms for example, the switching element $20a$ is turned on, so that all of the light emitting diodes on line b also emit. Similarly, by switching the switching elements on, lines a, b, c to n emit in sequence. When a predetermined on time has elapsed, the switches are turned off in sequence every 20 ms from the switching element $20a$, and the light emitting diodes on line n stop emitting last. If a fixed sequential delay time is determined in advance, and the on time is also predetermined in this manner, it is also possible to use a delay circuit comprising a capacitor and a resistor for example, instead of switching elements.

For example, by measuring in advance which regions of the adhesive layer are difficult to cure, and which are easy to cure, and by storing in advance the length of the on time of each switching element 20, the timing of the on time, the order of on, and the like in memory, the emission time of the light emitting diodes corresponding to the regions which are difficult to cure is made longer than that of the light emitting diodes corresponding to the regions which are easy cure, and it is also possible to cure uniformly in the shortest photo-irradiation time. In the embodiment, lines a, b, c to n are connected in series via the switching elements 20. However, since the light emitting diodes are connected in parallel in each of lines a, b, c to n, the voltage from a commercial power supply is sufficient. Lines a, b, c to n may be connected in parallel via each of the switching elements 20.

Furthermore, a photo-irradiation mechanism in which lines a, b, c to n are connected in parallel via switching elements, and a spinner as shown in FIG. 5, may be combined, and also a sensor may be installed that can measure the thickness of the adhesive layer from the innermost circle to the adhesive on the outermost circle. In this case, when rotated at high speed in order to spread the adhesive applied between the substrates 10, the thickness of the adhesive layer is measured from the innermost circle to the outermost circle, the measured value is compared with the set value stored in the CPU, and by switching on the switching elements of a line corresponding to a region where the thickness has reached the set value, firstly the light emitting diodes on this line are turned on, then the switching element corresponding to a region where the thickness of the adhesive layer next reaches the set value is turned on. Thus it is possible to radiate ultraviolet light in sequence from the region where the thickness first reaches the set value. By so doing, it is possible to obtain an adhesive layer of which all parts are closer to the set value, and thus it is possible to obtain an optical disc with higher quality.

As another embodiment, the arrangement may be such that lines of light emitting diodes connected in series, or connected in parallel, or a predetermined plurality of them connected in series and then connected in parallel, are arranged in a spiral pattern. Preferably, the diameter of the innermost side of the spiral pattern arrangement is smaller than the inner diameter of the adhesive layer between substrates, and the diameter on the outermost side is larger than the outer diameter of the adhesive layer between the substrates. This is adequate in itself, but delay elements, which generate a delay for a predetermined time, or switching elements, may be connected between the light emitting diodes connected in series or connected in parallel, or the switching elements or the delay elements may be connected at intervals of a plurality of light emitting diodes, for example, every 10 light emitting diodes. By switching the delay elements or the switching elements on sequentially, it is possible for the light emitting diodes arranged in a spiral pattern to emit one at a time, or a plurality of them at a time, from the internal circumference side towards the external circumference side. This enables an optical disc with higher quality to be obtained.

In the above embodiment, in order for the emission surface to be equal to or slightly larger than the surface of the adhesive layer to be cured, a large number of light emitting diodes is arranged in a concentric circular pattern or a spiral pattern. However, the light emitting diodes may be arranged at random and close to each other, in a hexagonal pattern such that the spacing between adjacent light emitting diodes is a fixed distance, in a concentric circular pattern, a spiral pattern or the like. Instead of arranging a large number of light emitting diodes so as to create an emission surface equal to or slightly larger than the surface of the adhesive layer to be cured, the light emitting diodes may be arranged such that the emission surface is made to be a part of the surface of the adhesive layer to be cured.

Figure 7A:
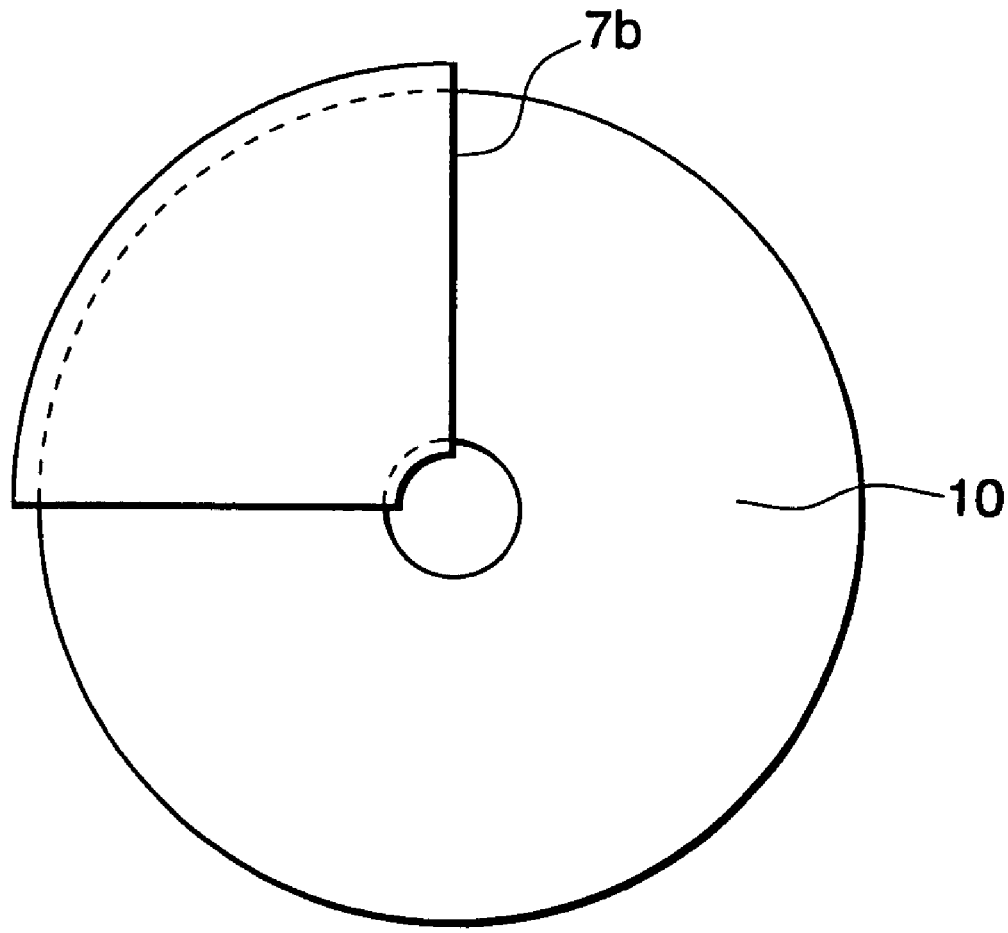
FIG. 7A and FIG. 7B are a plan view and a front view of another example of a semiconductor light emitting unit.
Figure 7B:
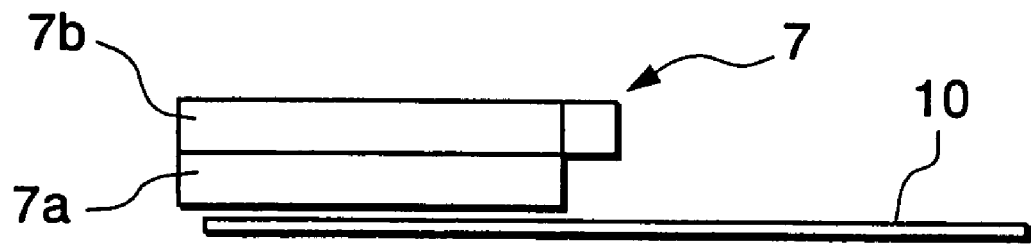
Figure 8:
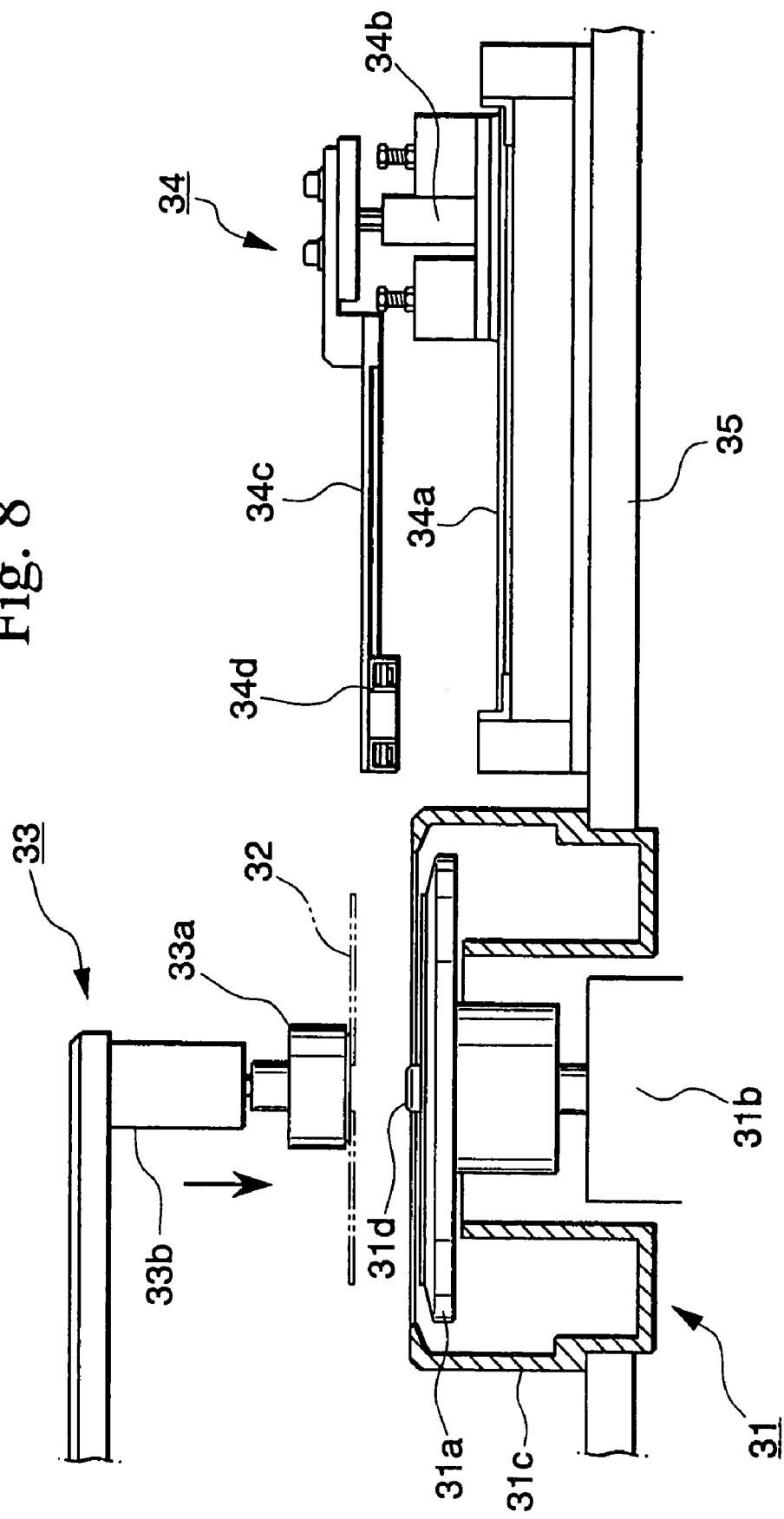
FIG. 8 to FIG. 13 are front views to explain the operation of an apparatus for bonding disc substrates of another embodiment.

This embodiment will be described with reference to FIG. 7. The support 7b of the semiconductor light emitting unit 7 has a fan-shaped printed substrate 7b. A plurality of light emitting diodes 7a is arranged at high density on this printed substrate 7b, and they are all connected in parallel by a conductive pattern (not shown in the figure) formed on the printed substrate 7b. Accordingly, all of the light emitting diodes 7a are turned on and off at the same time. Their emission surface X is at a predetermined distance of 10 mm or less from the surface of the substrate 10. In this embodiment, the semiconductor light emitting unit 7 and the substrate 10 are rotated at a certain rotation speed relative to each other. A rotation drive mechanism is required to rotate the substrate 10. However, if a spinner is used also as mentioned previously, no specific rotation drive mechanism is required. Since the support 7b is fan shaped, the number of light emitting diodes 7a arranged on the external outer arc is larger than that on the inner arc in proportion to the radius. Therefore, the irradiation time can be equal although the circumferential speeds are different between the inner arc and the outer arc. This semiconductor light emitting unit 7 can reduce the number of light emitting diodes required significantly compared with the aforementioned embodiment, and can reduce the cost. However, if light emitting diodes with the same characteristics are used, the time to cure the adhesive layer is longer. However, by blowing cooling air onto the region of the substrate where there is no semiconductor light emitting unit 7, it is possible to reduce the influence of the heat from the photo-polymerization reaction, so that it is possible for the emission surface X to approach closer to the substrate 10.

In the above embodiment, the light emitting diodes emit light continuously, but they may emit light in a pulse pattern, that is intermittently. In this case, compared with the case of emitting continuously, it is possible for a high peak current to flow into the light emitting diodes to generate ultraviolet light of high luminous intensity. By having a higher peak current than when emitting continuously, flowing sequentially from the light emitting diodes on the inner circumference to the light emitting diodes on the outer circumference, a curing adhesive of higher quality may be expected. Furthermore, by controlling the width and peak value of the current pulse supplied to each of the light emitting diodes, or the width of the dead time between current pulses, as required, it is possible to cure the adhesive more uniformly and with higher quality.

Adhesive suitable for the present invention will be described. At present, commercial ultraviolet light curing type adhesive usually contains photoinitiator which reduces the sensitivity to ultraviolet light so that curing does not start during handling. However, since a light emitting diode has a lower luminous intensity of ultraviolet light than a flash lamp, it is preferable to increase the amount of photoinitiator which enhances the sensitivity to ultraviolet light. Furthermore, if the photoinitiator added to the adhesive is increased to enhance the sensitivity to ultraviolet light, it is not possible to handle the adhesive in a conventional environment, and hence red light emitting diodes are used, preferably, for the environment lighting in this case. These red light emitting diodes emit ultraviolet light with a wavelength of tens of nm centered at 645 nm, and do not contain wavelengths in a wavelength range of 300 to 420 nm, so that adhesive with high sensitivity can be used in an environment lit by red light emitting diodes similarly to the conventional method. Furthermore, since yellow light emitting diodes emitting a yellow light with a wavelength of around 590 nm, and green light emitting diodes emitting a green light with a wavelength of around 520 nm do not contain wavelengths in a wavelength range of 300 to 420 nm fundamentally, it is possible to use them for lighting. In this manner, by using ultraviolet light emitting diodes in an apparatus for curing adhesive whose sensitivity to ultraviolet light is increased, and by using light emitting semiconductor elements that do not contain wavelengths in a wavelength range of 280 to 450 nm, such as red light emitting diodes, yellow light emitting diodes, or the like for the lighting of areas where the adhesive is handled, it is possible to reduce power usage costs significantly, it is very desirable environmentally, and the costs also can be reduced.

In the case where ultraviolet light emitting diodes are used in an apparatus for curing adhesive whose sensitivity to ultraviolet light is increased, and light emitting semiconductor elements, which have no wavelength in the wavelength range of 300 to 420 nm, are used for the lighting of areas where the adhesive is used, the process for applying the high sensitivity adhesive onto the substrates and the processes for stacking the substrates with the adhesive in-between, and bonding them together by spinning, are performed under the lighting generated by the light emitting semiconductor elements.

The description in the above embodiment uses optical disc substrates for the substrates. However, the substrates may be other transparent sheet type materials, such as glass, lenses, and the like, whose light transmissivity is high, and it is possible to bond them by curing similarly to the above.

Furthermore, in the above embodiment, an example is described in which a semiconductor light emitting unit comprises light emitting diodes. However, solid-state lasers, such as semiconductor lasers, which generate visible light laser beams with similar wavelengths may also be used. In this case, solid-state lasers are arranged such that the light focus of the solid-state lasers is soft, and the spacing between the semiconductor light emitting unit and the irradiation surface is large, so that a uniform light is radiated onto the irradiation surface. Moreover, it is also possible to use an argon gas laser which generates a laser beam with a wavelength of primarily 488.5 nm, a gas laser such as a helium/neon gas laser, which generates a laser beam with a wavelength of 632.8 nm, a dye laser of an appropriate color, or the like, as a light source.

Before removing the disc substrates from the spinner used for spreading the adhesive, a part or the whole of the adhesive may be semi-cured or cured by radiating ultraviolet light with a peak wavelength in the range of 280 to 450 nm for tacking purposes. In this case, it is preferable to perform the tacking while the spinner is rotating, because the tacking can be performed uniformly, and no extra time for tacking is required. Especially in order not to affect the optical discs, it is preferable to perform the tacking by radiating ultraviolet light with a peak wavelength in the range of 280 to 450 nm onto the adhesive in only a non-recording region on the internal circumference side of the disc substrates to semi-cure or cure them. In this case, since there is hardly any detrimental effect on the other areas by ultraviolet light irradiation, it is possible to perform the tacking by ultraviolet light irradiation in the spinner. In this manner, if the optical disc substrates are removed from the spinner after tacking by a typical transfer mechanism, which is not shown in the figure, and transferred to the next process, there is no shift between an optical transmission layer and the disc substrates, or between the disc substrates themselves, and hence it is possible to obtain an optical disc with high quality.

In the above embodiment an example is described in which light emitting diodes are used as light emitting semiconductor elements. However, a semiconductor laser with a wavelength peak in a wavelength range of 280 to 450 nm, for example a bluish purple laser, which generates a laser beam with a wavelength of 405 nm may be used. Furthermore, a gas laser, such as a YAG laser doped with neodymium (Nd), which generates a laser beam with a wavelength whose third harmonic is 355 nm, an Ar laser (diatomic ion) with a wavelength of about 351 nm or 364 nm, or the like may be used. It is also possible to perform tacking efficiently by using a gas laser, and radiating a laser beam onto the adhesive in only a non-recording region on the internal circumference side of the optical disc substrates while rotating the optical substrates to semi-cure or cure them.

Furthermore, a lamp such as a fluorescent lamp may be combined with a bandpass filter that blocks wavelengths of and around 405 nm. In this case, the bandpass filter irradiates onto the optical disc substrates, visible light of wavelengths longer than 405 nm, being the wavelength of light emitted by a bluish purple laser that records on the recording film of the optical disc, and neighboring wavelengths, and preferably only visible light of wavelengths 430 nm or greater. At least light equal to or shorter than the wavelengths of and around 405 nm are blocked, and are not radiated onto the optical disc substrates.

In this embodiment, similarly to the embodiment described previously, it is possible to cure an optical transmission layer, or an adhesive of a visible light curing type composition without damaging the recording film of an optical disc to be recorded on and played back by bluish purple laser beams. Furthermore, it is possible to provide an optical disc which employs a visible light curing type composition, which has high transmissivity of light with wavelengths of and around 405 nm, even after curing.

EMBODIMENT 2

Next is a description of embodiment 2 of the present invention. In FIG. 8 through FIG. 15, a spinner 31 rotates two disc substrates 32 stacked via intermediate adhesive at high speed to spread the adhesive between the two disc substrates and remove excess adhesive. The spinner 31 has a disc pedestal 31a, which receives the two disc substrates 32 from a transfer mechanism 33 and attracts and holds them, a rotation drive unit 31b such as an electric motor for rotating the disc pedestal 31 at high speed, a cylindrical outer wall 31c for preventing removed adhesive from splashing, and a center pin 31d.

The transfer mechanism 33 transfers the two disc substrates stacked via intermediate adhesive from another place to the disc pedestal 31a, mounts them, and transfers the bonded disc substrates 32 to a different place. The transfer mechanism 33 has an attraction head section 33a for attracting or releasing the disc substrates, a handling section 33b for moving the attraction head section 33a in the vertical direction and horizontal direction, and a drive section (omitted in the figure) for driving the handling section 33b.

The tacking mechanism 34 is an essential element in this embodiment. The tacking mechanism 34 has a horizontal direction drive unit 34a, such as a cylinder fixed on a base 35, a vertical direction drive unit 34b, such as a cylinder installed on the horizontal direction drive unit 34a, an arm section 34c fixed on the moving part of the vertical direction drive unit 34b, and a tacking emission mechanism 34d fitted at the end of the arm section 34c.

FIG. 14A and FIG. 14B show an example of a tacking emission mechanism 34d. This tacking emission mechanism 34d has a support member A3, which is fixed at the end of the arm 34c, and a plurality of light emitting diodes B3, which are arranged in an annular pattern on the support member A3, and that are connected electrically in series or in parallel. The light emitting diodes B3 are mounted on a ring shaped printed circuit board C3 on which conductive patterns connected in parallel or series are formed. An input cable D3 is installed for supplying direct current to the light emitting diodes. The disc substrates 32 have center holes, and have an internal circumference region of a predetermined width centered on the center holes, widely known as a non-recording region (for example, L shown in FIG. 15), where no information is recorded. Information is stored in the area outside the non-recording region L, which is an information recording region to be recorded on later. The light emitting diodes B3 arranged in an annular pattern are arranged on an imaginary circle facing the non-recording region of the disc substrates 32. One layer of light emitting diodes B3 is fitted in the figure. However, since light such as ultraviolet light may be radiated onto the adhesive in the non-recording region of the disc substrates 32, two or more rows of light emitting diodes B3 may be fitted.

Next, an example of a tacking method will be described using FIG. 8 through FIG. 14A and FIG. 14B. Firstly, the transfer mechanism 33 attracts the disc substrates 32 stacked via intermediate adhesive applied in a doughnut shape, using the attraction head section 33a to move the substrates 32 directly above the disc pedestal 31a of the spinner 31. Next, the handling section 33b is lowered, and the handling section 33b stops immediately before the disc substrates 32 touch the disc pedestal 31a. At the same time, the attraction head section 33a stops attraction, and the disc substrates 32 are mounted on the disc pedestal 31a. At this time, the disc substrates 32 are centered by the centering member 31d located in the center of the disc pedestal 31a.

Figure 9:
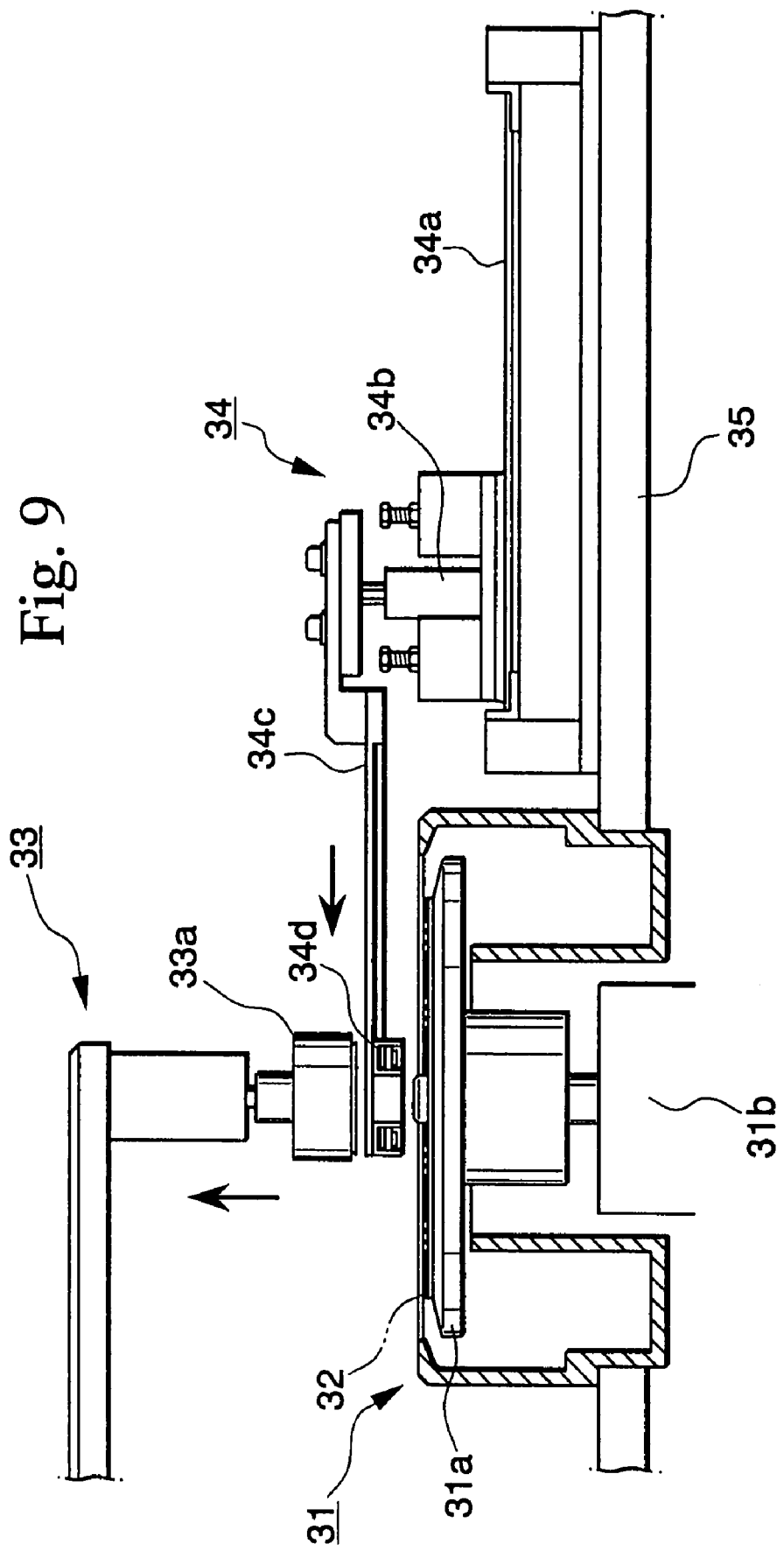

Next, as shown in FIG. 9, the handling section 33b of the transfer mechanism 33 starts to ascend, and at the same time the rotation drive unit 31b rotates the disc pedestal 31a at high speed while the disc substrates 32 are attracted to the disc pedestal 31a of the spinner 31. In this manner, the disc substrates 32 are rotated at high speed to spread adhesive between the disc substrates, and remove excess adhesive. In this process, the horizontal direction drive unit 34a of the tacking mechanism 34 operates, and moves the vertical direction drive unit 34b and the arm section 34c fixed thereon in the direction of the arrow, that is to say towards the left in the figure, moves the tacking emission mechanism 34d at the end to a predetermined location, and then the horizontal direction drive unit 34a stops operation.

Figure 10:
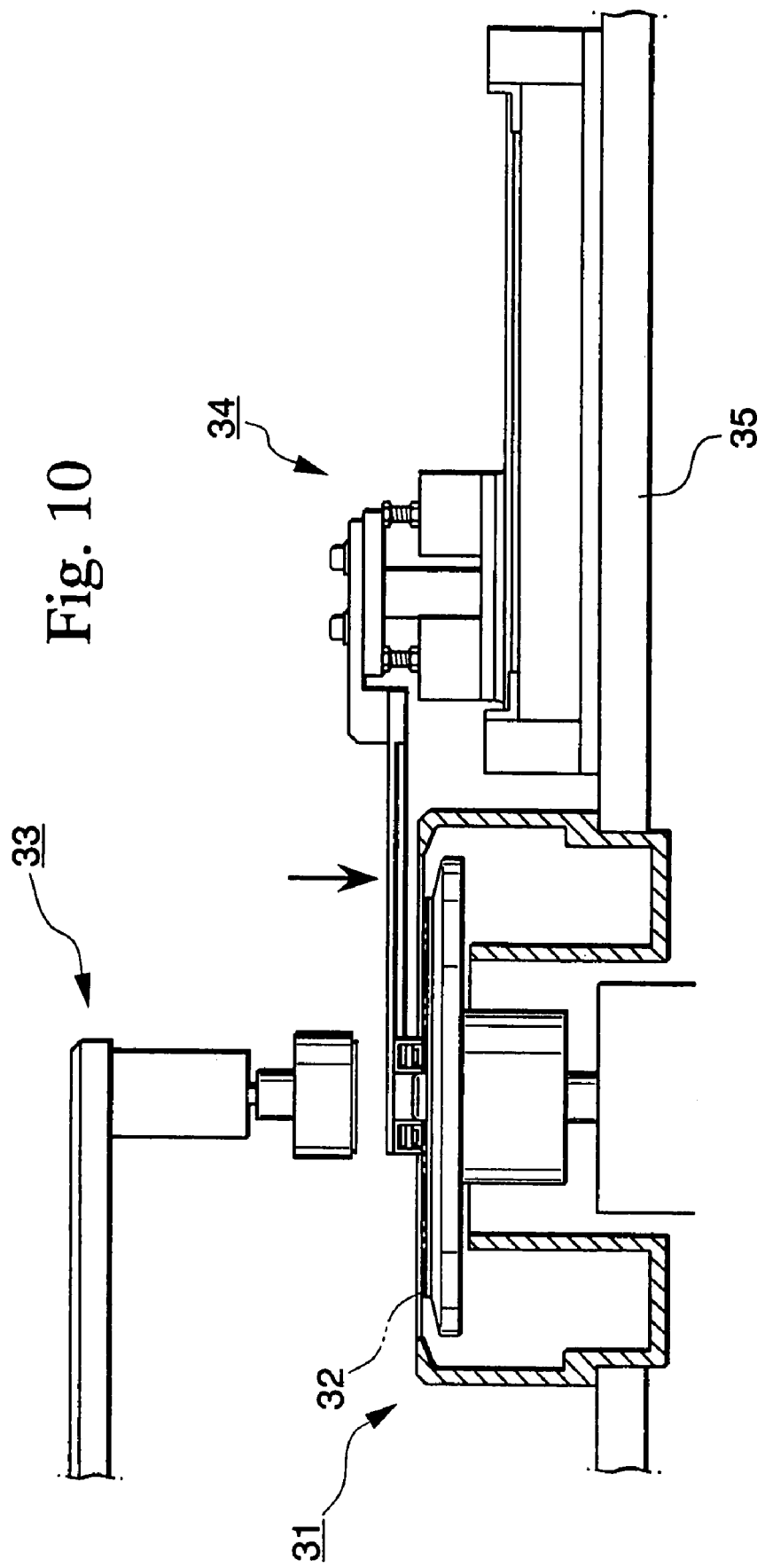

The vertical direction drive unit 34b starts to descend, moves the arm section 34c down vertically as shown in FIG. 10, and stops at a location where it does not touch the disc substrates 32, for example at a location 0.4 mm or more from the top surface of the disc substrates. The tacking emission mechanism 34d starts emission after the adhesive layer is spread between the disc substrates by high speed rotation, and radiates ultraviolet light onto only an adhesive layer formed in the non-recording region of the disc substrates 32 to semi-cure or cure the adhesive layer. The disc substrates 32 are preferably rotated at high speed at this time, which enables the adhesive layer to be semi-cured or cured uniformly. Although it depends on how long is required for tacking, in the case where a longer time is required for tacking than the time of high speed rotation, an appropriate low speed rotation time may be provided after the high speed rotation finishes.

Figure 11:
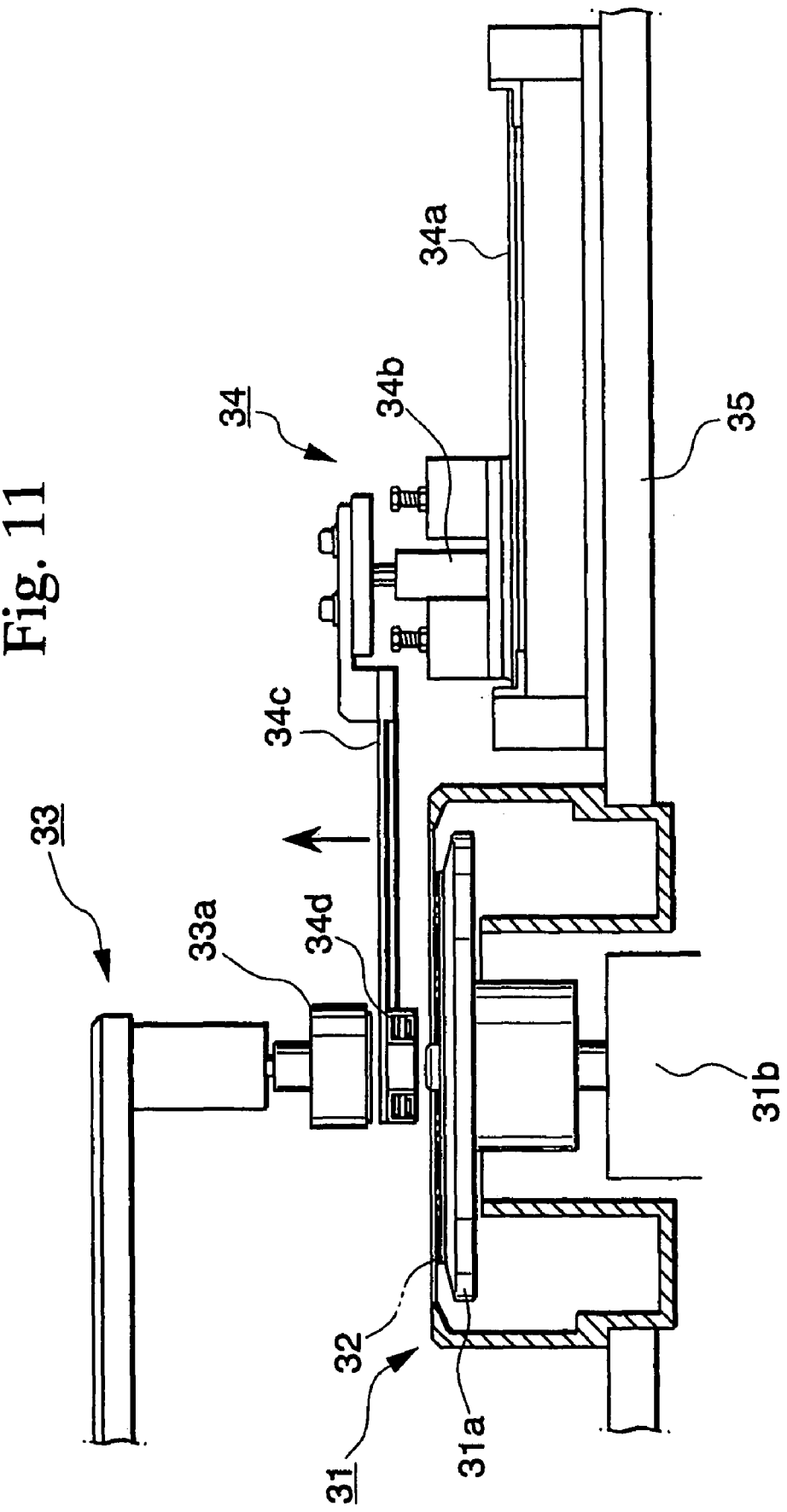
Figure 12:
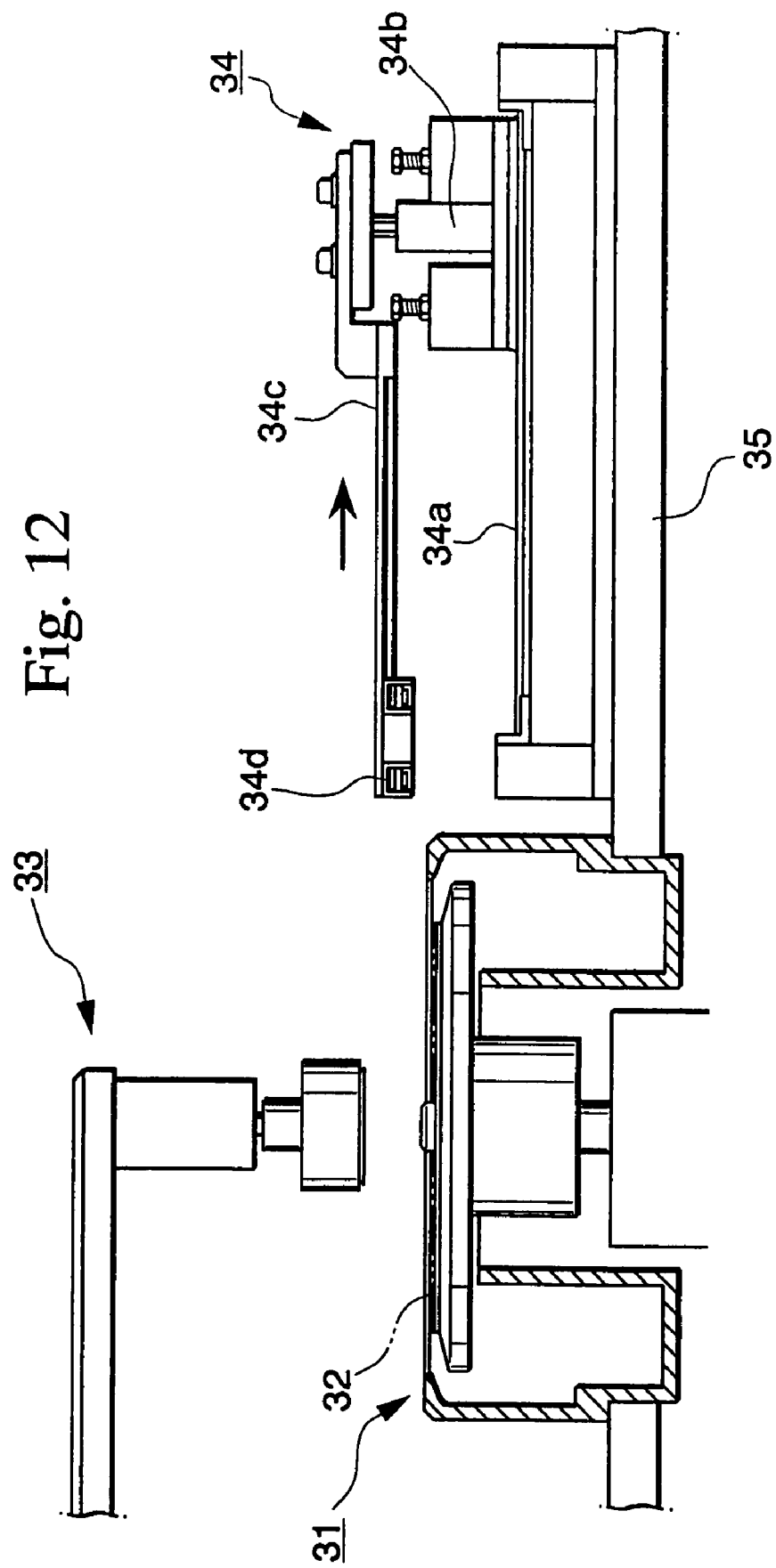
Figure 13:
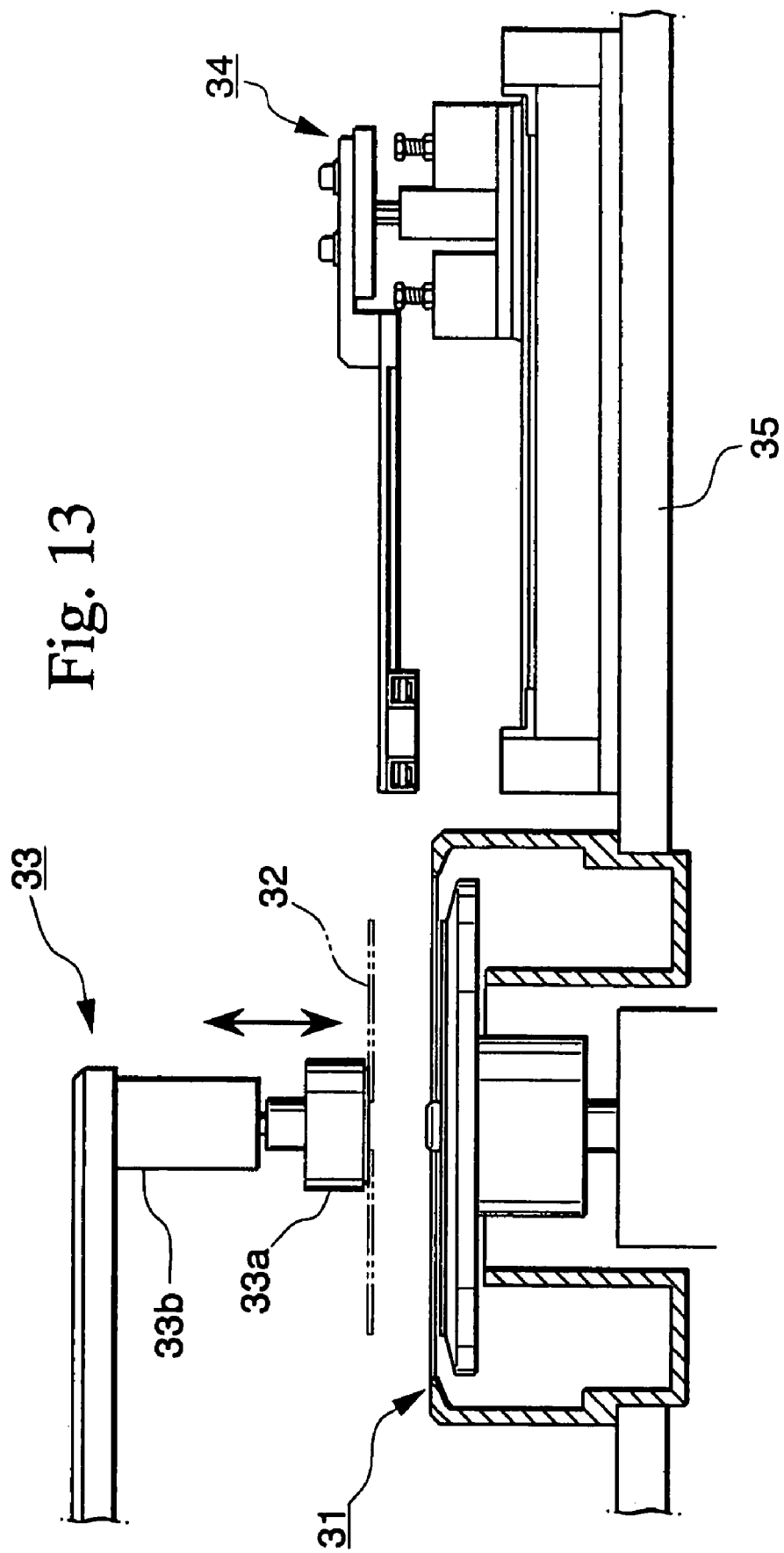

When the adhesive layer is semi-cured or cured, and tacking finishes, the tacking emission mechanism 34d stops emitting ultraviolet light, and the vertical direction drive unit 34b raises the arm section 34c vertically upwards slightly as shown in FIG. 11. Next, the horizontal direction drive unit 34a operates to move the arm section 34c to the initial position in the direction of the arrow, that is towards the right in the figure, and stops. At this time, as shown in FIG. 13, the transfer mechanism 33 attracts and holds the tacked disc substrates 32 by the attraction head section 33a, and lifts it to transfer it to the next location, for example a location for curing by ultraviolet light irradiation, which is not shown in the figure, and cures the adhesive sufficiently. Afterwards the same operations are repeated.

As described above, in this embodiment, after adhesive is spread between the disc substrates 32 by high speed rotation using the spinner 31, ultraviolet light is immediately radiated only onto an adhesive layer formed in the non-recording region of the disc substrates 32 to semi-cure or cure it for tacking purposes, and they are then transferred to the next location. Accordingly, there is no detrimental effect on the information recording region, and no shift occurs between the disc substrates 32 during transfer. Furthermore, since tacking is performed in a condition where the two disc substrates 32 are substantially centered by high speed rotation, it is possible to obtain a disc with higher quality than conventionally.

Another embodiment will be described. The tacking emission mechanism 34d as shown in FIG. 15 starts emitting ultraviolet light when a predetermined time has elapsed after the spinner 31 starts rotating at high speed. The predetermined time cannot be set to an absolute value since it is affected by characteristics such as the viscosity of adhesive, temperature, humidity of the environment, and the like, but is determined by the conditions at the time using experimental data obtained and stored in advance in a CPU. The predetermined time can also be set according to the characteristics of the adhesive to be used, by maintaining the environment at a constant temperature, humidity and the like. In this manner, when detecting that the predetermined time has elapsed using a timer, which is not shown in the figure, after the spinner 31 starts rotating at high speed, current is supplied from the input cable D3, and the tacking light emitting mechanism 34d emits light. Thus it is possible to cure the adhesive 32c in the non-recording region between the disc substrates 32a and 32b before it flows from the center hole of the disc substrates 32a and 32b. Accordingly, by further controlling the point of time when the tacking light emitting mechanism 34d starts emitting light, it is possible to control the spread of adhesive toward the internal circumference side. Thus it is also possible to spread it to locations closer to the edge of the internal circumference than that shown in FIG. 15.

Figure 16:
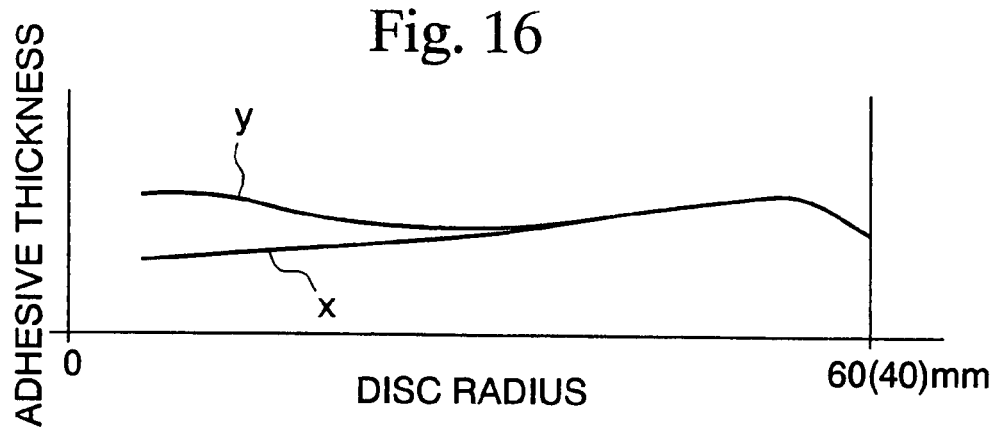
FIG. 16 is a graph showing the thickness of an adhesive layer.

In general, as shown by the chain lines in FIG. 16, if adhesive is rotated at high speed to spread it between the disc substrates, there is a tendency for the thickness of the adhesive layer to be thinner toward the inside than toward the outside due to centrifugal force, as shown by curve x. However, as mentioned previously, while the disc substrates are rotating at high speed, for example from when half of the high speed rotation time has elapsed to when four fifths has elapsed, if ultraviolet light emitted by the tacking light emitting mechanism 34d is radiated onto only the adhesive layer formed in the non-recording region of the disc substrates to semi-cure or cure it for tacking purposes, spreading toward the internal circumference is limited. As a result, it is possible to thicken the adhesive layer spreading toward the internal circumference as shown by curve y. That is to say, it is possible to control the thickness of the adhesive on the internal circumference side of the disc substrates.

In the above embodiments, light emitting diodes are used for the tacking light emitting mechanism 34d of the tacking mechanism 34. However, semiconductor lasers or gas lasers may be used. In the case of semiconductor lasers, the arrangement may be such that one semiconductor laser, or a plurality of them arranged at equal spacing or in a zigzag, replaces the light emitting diodes. In the case of gas lasers, since greater power can be obtained than from semiconductor lasers, using one gas laser, the gas laser may be arranged such that the laser beam is radiated onto the non-recording region of the disc substrates, and the disc substrates may be rotated. However, the disc substrates are not necessarily rotated, and it is also possible to rotate the tacking light emitting mechanism 34d of the tacking mechanism 34.

The tacking power can be improved without using a laser beam by forming the disc pedestal 31a from a transparent material such as glass, arranging another tacking light emitting mechanism 34d below the disc pedestal 31a, and radiating ultraviolet light onto the adhesive layer from both sides of the disc substrates 32, which enables the tacking to be performed in a shorter time.

In the case of radiating only from the top side, if an ultraviolet light reflecting film is formed in the ultraviolet light irradiation region on the surface of the disc pedestal 31a, tacking can be performed efficiently by the reflected ultraviolet light.

In the above embodiment, the adhesive layer of the disc substrates on the disc pedestal of the spinner is tacked. However, as shown in FIG. 15, in the case where the centering member is pin shaped, the diameter of the centering member must be sufficiently smaller than the center hole of the disc substrates 32. As a result, it is not possible to center the two disc substrates 32a and 32b with high accuracy. Therefore, in this embodiment, the construction is such that a centering mechanism is provided at a location where the substrates are mounted temporarily, and the diameter of the centering member 31d of a pedestal, which is not shown in the figure, can be expanded and contracted.

Figure 17A:
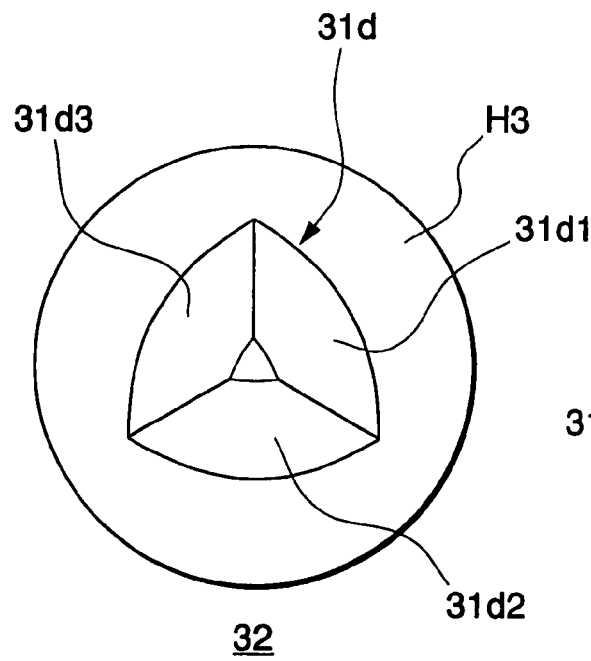
FIG. 17A and FIG. 17B are plan views of examples of centering members.
Figure 17B:
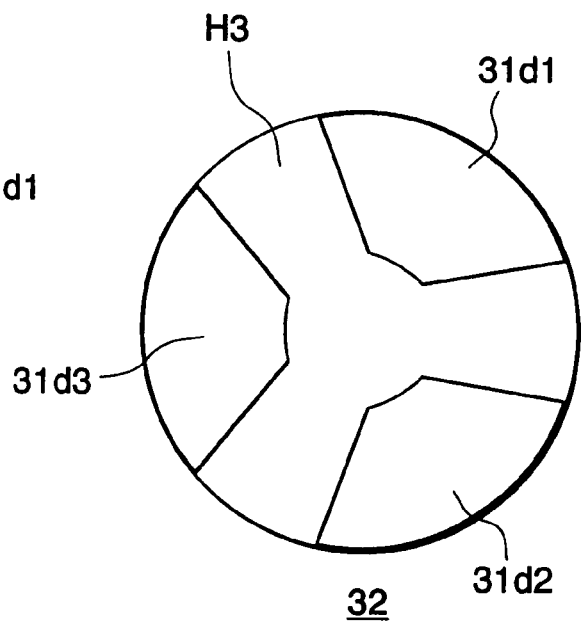

The centering member 31d has a structure consisting of three 120° segments around its center, and it expands and contracts the fan shaped centering pieces 1d1, 1d2 and 1d3 using a drive unit, which is not shown in the figure. In a normal state, as shown in FIG. 17A, the diameter of the centering pieces 1d1, 1d2 and 1d3 is contracted, so the outline of the centering member 31d is small. The disc substrates 32 are mounted on the pedestal, which is not shown in the figure, while the diameter is contracted, so that the centering member 31d is inserted into the center hole H3 of the disc substrates 32. Next, when the drive unit, which is not shown in the figure, expands the diameter of the centering member 31d, the diameter of the centering pieces 1d1, 1d2 and 1d3 expands outward radially as shown in FIG. 17B, and the arc sections press outwards against the internal circumference of the disc substrates 32 radially. This pressure enables the disc substrates 32 to be centered with considerable accuracy.

In this highly accurate centered state, the tacking light emitting mechanism 34d of the tacking mechanism is arranged as shown in FIG. 15, and ultraviolet light is radiated onto the adhesive layer in the non-recording region for tacking. Thus there is no shift observed at all between the disc substrates even when they are transferred to a curing apparatus, which is not shown in the figure, by a transfer mechanism, which is not shown in the figure. Therefore, it is possible to obtain a DVD with highly accurate centering. The centering member 31d is not limited to the structures shown in FIG. 17A and FIG. 17B provided that it expands and contracts its diameter. The embodiments of FIG. 17A and FIG. 17B show constructions in which the diameter of the centering member 31d of the pedestal, which is not shown in the figure, being a temporary mounting location, can be expanded and contracted. However, the construction may be such that the diameter of the centering member of the spinner can be expanded and contracted.

In the above embodiment, since the adhesive layer in the non-recording region on the inner side of the disc substrates is semi-cured or cured, it has no effect on curing the adhesive layer later, compared with the case where the adhesive layer in the non-recording region on the outer side is semi-cured or cured. At the time of tacking, the disc substrates 32 and the tacking light emitting mechanism 34d do not always rotate relative to each other, and the tacking light emitting mechanism 34d may touch the surface of the non-recording region of the disc substrates 32. Furthermore, it is also possible to obtain the desired effect of the present invention by the tacking light emitting mechanism 34d radiating ultraviolet light onto the whole surface or part of the non-recording region and the information recording region of the disc substrates 32 to semi-cure or cure the adhesive layer between the disc substrates corresponding to the non-recording region and the information recording region of the disc substrates. Each of the disc substrates may consist of two disc substrates bonded together. One disc substrate may be a thin film, which will become a cover layer of a next generation DVD. in the above embodiment, an attraction head is described. However, other types such as those that hold mechanically may also be used instead of the attraction type.

EMBODIMENT 3

Figure 18:
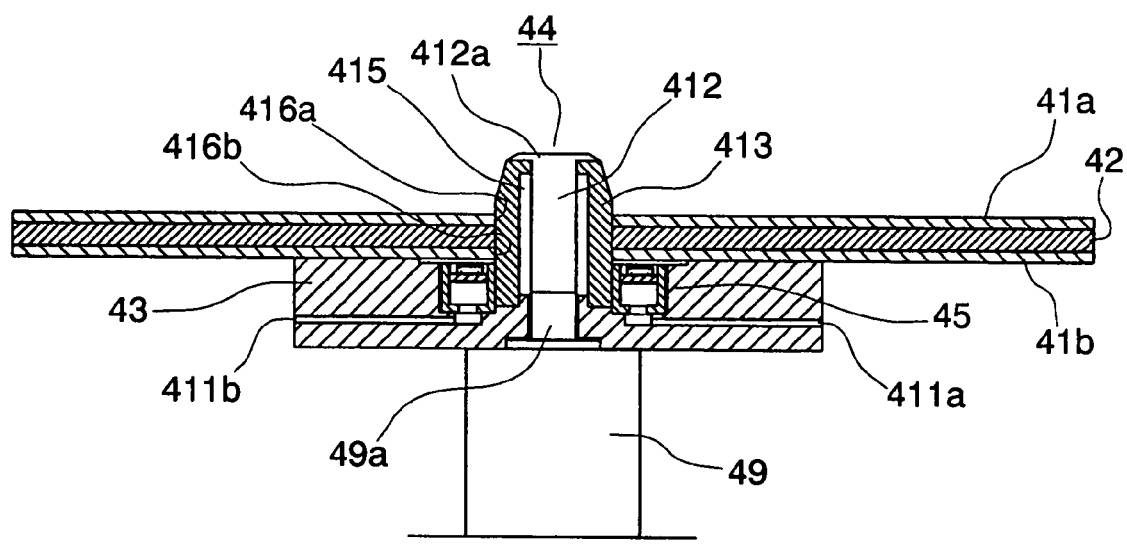
FIG. 18 is a sectional view showing another embodiment of an apparatus for bonding disc substrates of the present invention.

FIG. 18 shows a disc mounting stage used in a third embodiment of a disc substrate bonding apparatus. The disc mounting stage basically comprises a mounting stage 43 for supporting disc substrates 41a and 41b stacked via intermediate adhesive, and a centering mechanism 44, which is inserted into the center holes of the disc substrates 41a and 41b, and an emission mechanism 45, which encircles it and is fitted on the mounting stage 43.

Figure 19:
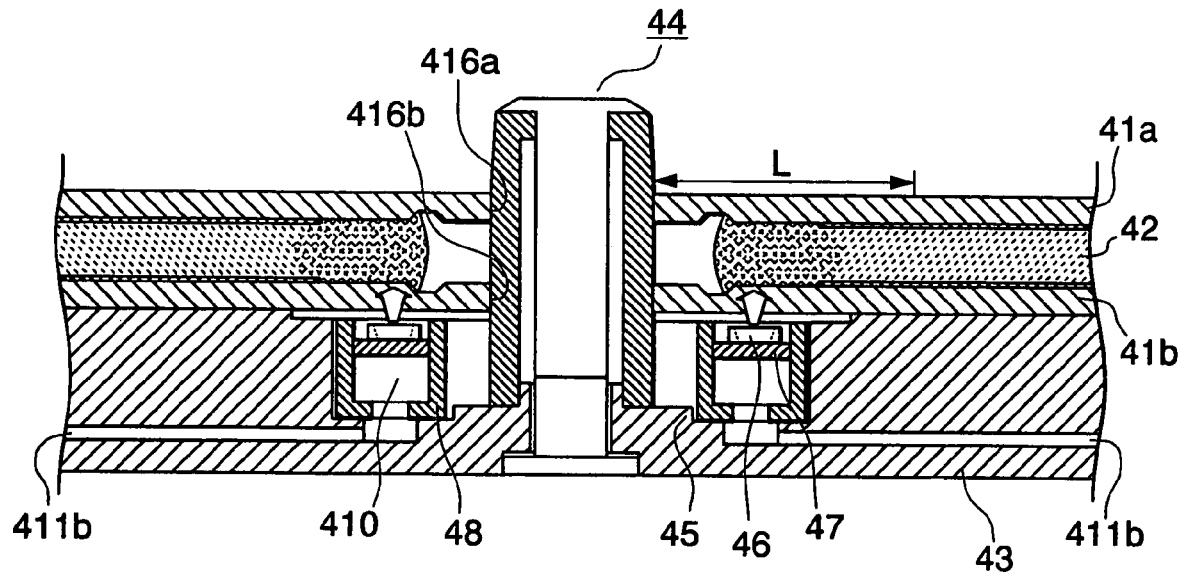
FIG. 19 is an enlarged sectional view of a disc mounting stage.
Figure 20:
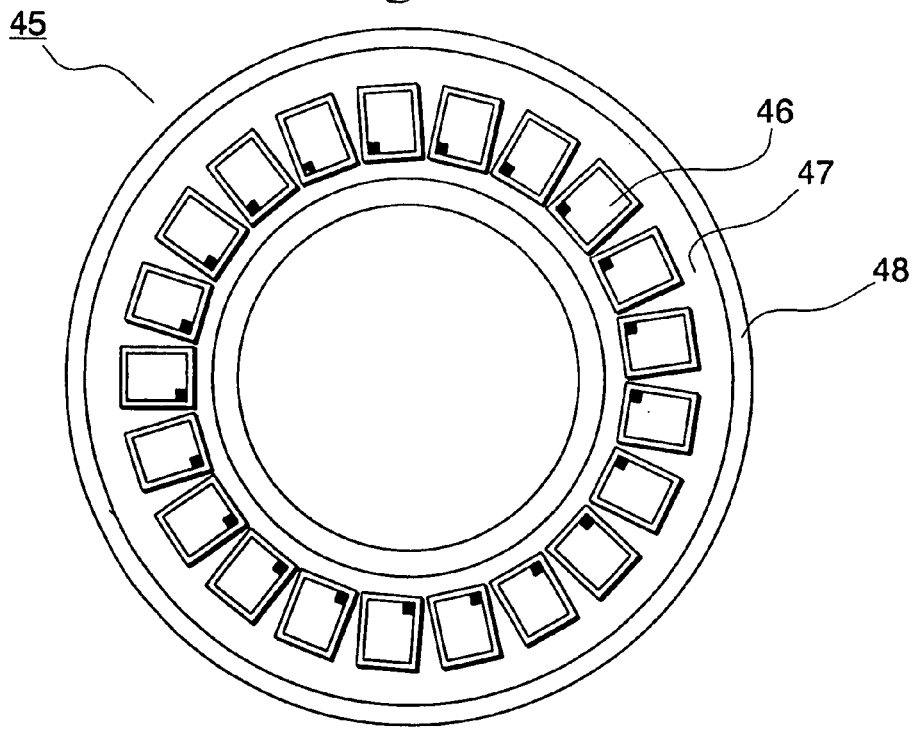
FIG. 20 is a plan view of an emission mechanism.

As shown in FIG. 19 and FIG. 20, the emission mechanism 45 comprises a plurality of light emitting diodes 46 arranged in an annular pattern, and the light emitting diodes 46 are mounted on an annular shaped printed circuit board 47 on which a conductive pattern is formed. The light emitting diodes 46 arranged in an annular pattern are arranged inside the mounting stage 43 facing toward a non-recording region (for example, L as shown in FIG. 19) of a predetermined width centered on the center holes of the disc substrates 41 and 41b. The light wavelength region in which the light emitting diodes emit light is preferably from 280 nm to 450 nm, considering the wavelength characteristics of the disc substrates, the wavelength region where the photopolymerization reaction of adhesive occurs, and the like.

When the light emitting diodes 46 are mounted at high density, the amount of heat generated cannot be ignored. Accordingly, in this embodiment, a thin heat sink made of aluminum, which is not shown in the figure, is provided at the back of the printed circuit board 47 where the light emitting diodes 46 are mounted. Furthermore, the printed circuit board 47 where the light emitting diodes 46 are mounted is held in an annular shaped support member 48. In order to cool the aluminum heat sink, which is not shown in the figure, a cooling medium distribution path 410 through which air is passed is provided under the heat sink. Cooling air which is supplied from a supply port 411a, cools the heat sink while passing through the annular shaped cooling medium distribution path 410, and is then exhausted from an exhaust vent 411b.

Heat generated by the light emitting diodes 46 is dissipated by the aluminum heat sink. Furthermore, since the surface of the heat sink is cooled, the cooling efficiency is high, so that it is possible to prevent the disc substrates from being affected by heat conduction and the light emitting diodes 46 from being damaged by the heat generated.

The emission mechanism 45 where the light emitting diodes 46 are mounted on the support member 48 can be handled as a single component. Accordingly, in the case where the light emitting diodes 46 are damaged, the whole emission mechanism can be changed, which makes maintenance easy. Numeral 49 shown in FIG. 18 denotes a cylinder having a cylinder rod 49a, operating as an up-and-down drive unit.

As shown in FIG. 18, the centering mechanism 44 comprises a shaft 412, which is moved up and down, and an elastic body 413. The shaft 412 is column shaped, and has an umbrella section 412a on the top, which expands radially from the shaft 412 like an umbrella. The bottom of the shaft 412 is connected to the cylinder rod 49a of the cylinder 49, being a drive mechanism that moves the shaft 412 up and down.

The elastic body 413 is made of a resin having an appropriate elasticity and hardness, such as silicon rubber for example. As shown in FIG. 18, the elastic body 413 is installed around the shaft 412, and the top of the elastic body 413 is pressed down by the bottom of the umbrella section 412a. The elastic body 413 has an appropriate thickness, and there is a gap 415 between the elastic body 413 and the side face of the shaft 412.

When the shaft 412 is lowered by backward movement of the cylinder rod 49a of the cylinder 49, the elastic body 413 is pressed by the umbrella section 412a of the shaft 412, and contracts in the central axis direction of the center holes of the disc substrates 41a and 41b, and the silicon rubber elastic body 413 expands in the radial direction of the disc substrates 41a and 41b.

Figure 21:
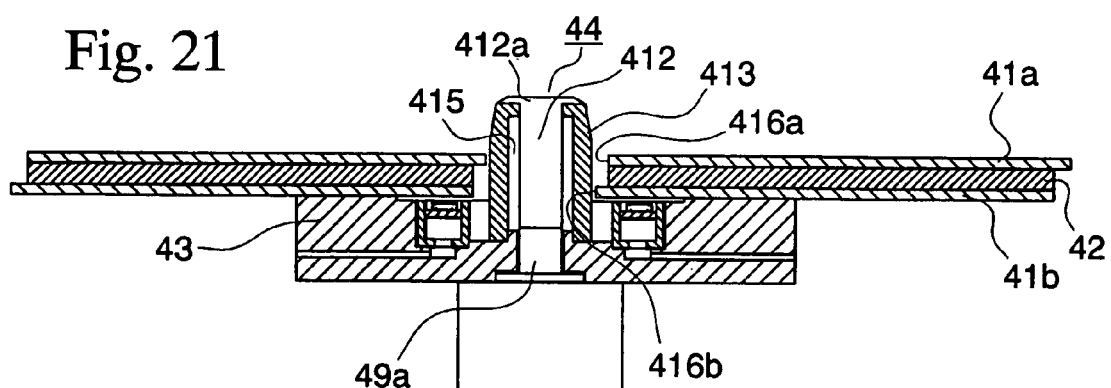
FIG. 21 and FIG. 22 are sectional views showing the operation of a centering mechanism.
Figure 22:
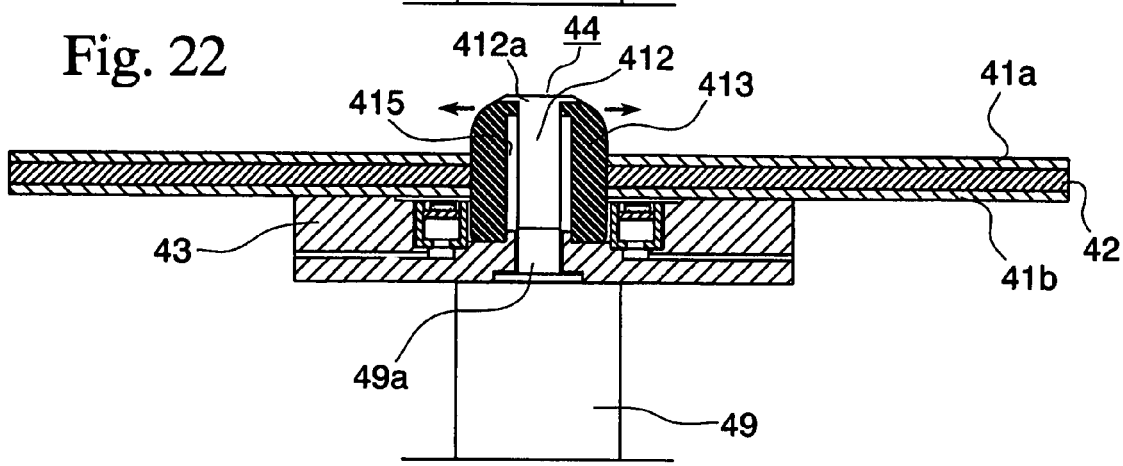

As shown in FIG. 21 and FIG. 22, the silicon rubber elastic body 413, inserted into the center holes of the two disc substrates 41a and 41b stacked via intermediate adhesive 42, expands radially, thus pressing the internal circumference side faces 416a and 416b of the disc substrates 41a and 41b to correct any shift.

When the elastic body 413 expands radially, since there is a gap 415 between the elastic body 413 and the side face of the shaft 412, then as the elastic body 413 is put under load from the internal circumference side faces 416a and 416b of the center holes of the disc substrates 41a and 41b, the elastic body 413 can release the pressure towards the gap 415. As a result, no more stress than necessary is applied to the internal circumference side faces 416a and 416b.

Afterwards, when the shaft 412 is raised by forward movement of the cylinder rod 49a of the cylinder 49, the silicon rubber elastic body 413 returns to its original shape due to its elasticity, and pressure is released from the internal circumference side faces 416a and 416b of the center holes of the disc substrates 41a and 41b.

Figure 23:
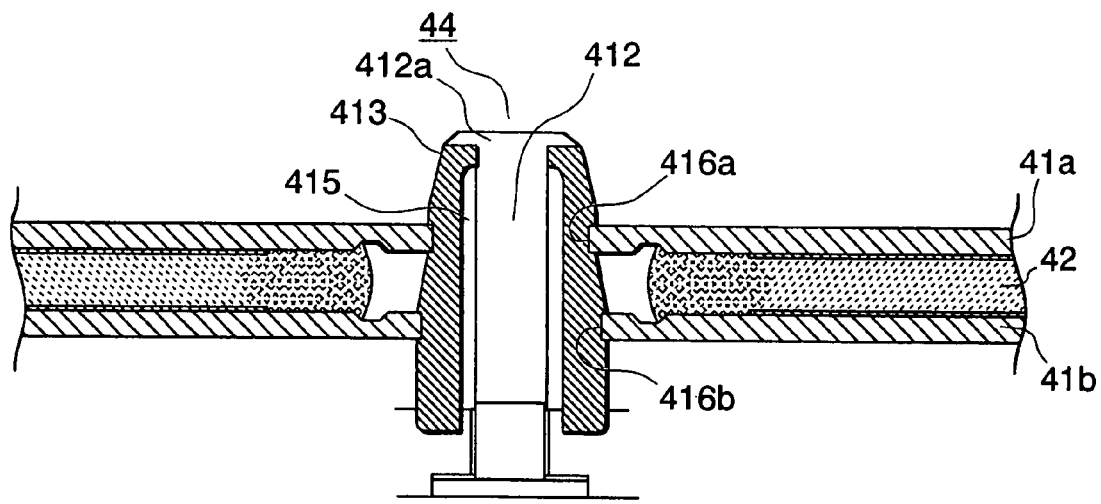
FIG. 23 is a sectional view of the centering mechanism.

In order to correct the shift between the disc substrates 41a and 41b, it is necessary to add appropriate pressure to the internal circumference side faces 416a and 416b of the center holes of the two disc substrates. However, as mentioned above, the inside diameters of the center holes of the disc substrates to be molded vary, and they do not always match. As shown in FIG. 23, when the silicon rubber elastic body 413 expands in the radial direction of the disc substrates, the elastic body 413 is distorted flexibly along the internal circumference side faces 416a and 416b of the center holes of two disc substrates whose inner diameters are different, and by applying pressure along the whole length of the two internal circumference side faces 416a and 416b, it is possible to correct the shift and center them accurately without loading one, or part of one, side face. As a result, there is no detrimental effect on the tilt of the disc substrates 41a and 41b.

When the silicon rubber elastic body 413 is expanded in the radial direction, it is preferable that the arc of the side face of the elastic body 413 is large, and the closer it is to flat, the better. In the case of a small arc, since optimal pressure cannot be applied to the internal circumference side faces 416a and 416b of the center holes of the stacked disc substrates 41a and 41b, there is a possibility in that force applied to the stacked disc substrates pulls them apart. Therefore, the elastic body 413 needs to be a certain height, so the elastic body 413 of the present embodiment has a height of around 10 mm from the surface of the disc substrate 41a mounted on the mounting stage 43.

Figure 24A:
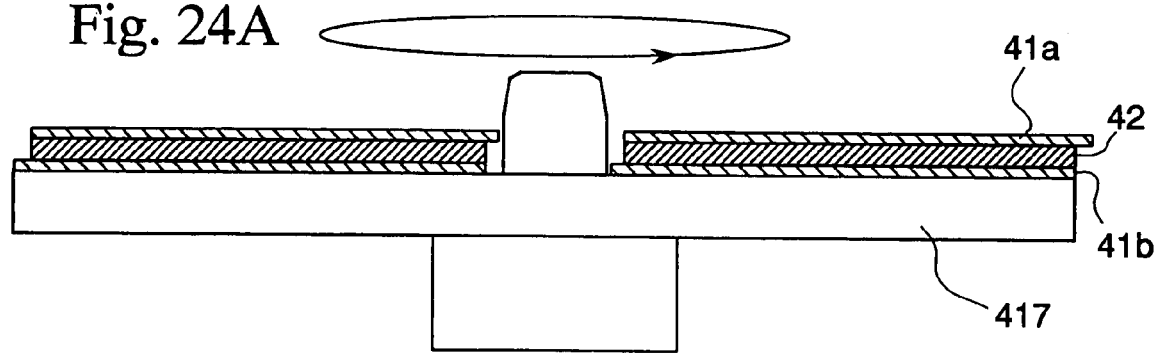

An example of a method for bonding disc substrates will be described using FIG. 24A to FIG. 24D. As shown in FIG. 24A, the two disc substrates 41a and 41b stacked via intermediate adhesive 42 are mounted on the mounting stage 17 of the spinner for high speed rotation to spread the adhesive 42 between the disc substrates uniformly, and remove excess adhesive.

Figure 24B:
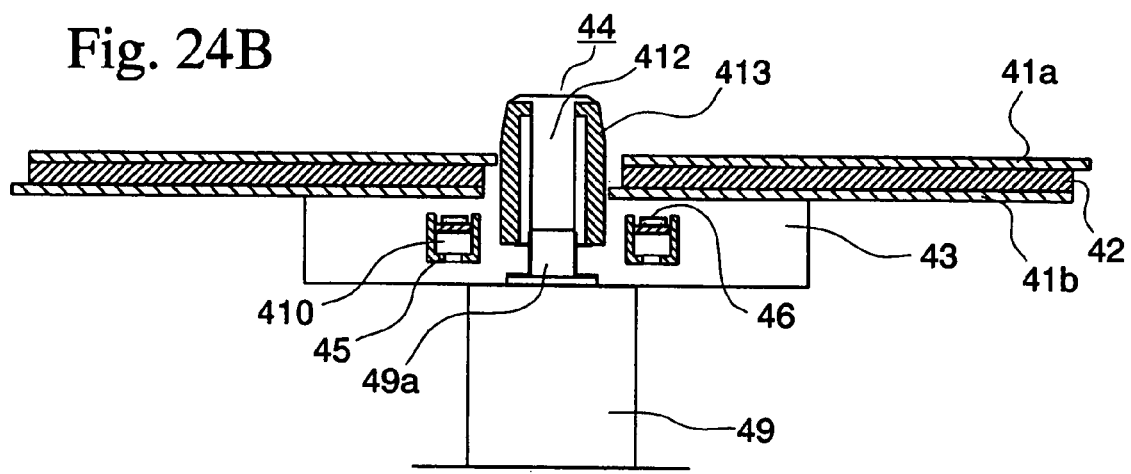

Next, as shown in FIG. 24B, after the adhesive 42 is spread between the disc substrates uniformly by high speed rotation, the disc substrates are mounted on the disc mounting stage 43 of the present invention by a transfer mechanism, which is not shown in the figure, and the center holes of the disc substrates are inserted into a centering mechanism 44. The disc mounting stage 43 is located between the spinner of a bonding apparatus and an ultraviolet light irradiation apparatus.

Next, as shown in FIG. 24C, when the disc substrates are mounted, a cylinder rod 49a of a cylinder 49 operates to lower a shaft 412, so that the elastic body 413 is pressed down from the top, and expands in the radial direction of the disc substrates. As a result, the shift between the disc substrates is corrected for accurate centering with no detrimental effect on the tilt.

After centering, a plurality of light emitting diodes 46 of an emission mechanism 45 installed in the periphery of the centering mechanism 44 of the disc mounting stage 43 starts emitting light to cure the adhesive layer in the non-recording region of the disc substrates.

By curing the adhesive layer in the non-recording region, as well as maintaining centering, there is also an effect of preventing the adhesive 42 from leaking from the internal circumference side faces 416a and 416b of the center holes of the disc substrates 41a and 41b. Furthermore, by controlling the point of time at which the light emitting diodes 46 start emitting light, it is possible to prevent the adhesive 42 from spreading toward the internal circumference. As a result, it is possible to enhance the adhesive strength in the internal circumference of the disc substrates, thus enabling an optical disc with an excellent visual appearance to be obtained.

It is preferable to ventilate cooling air into the cooling medium distribution path 410 installed below the light emitting diodes 46 so that the temperature of the disc substrates does not increase due to the heat generated by the emission from the light emitting diodes 46.

Afterwards, as shown in FIG. 24D, the centered and tacked disc substrates are transferred to a mounting stage 418 of an ultraviolet light curing apparatus at another location, and irradiated by ultraviolet light from an ultraviolet light radiating lamp 419, so that the adhesive 42 of the whole area between the substrates is completely cured.

In this embodiment, after the adhesive 42 is spread by high speed rotation, and before curing the adhesive 42 of the whole area between the stacked disc substrates, the stacked disc substrates are centered accurately on the disc mounting stage 43 of the present invention. Thus it is possible to partially cure the adhesive between the substrates for tacking, without reducing the production efficiency.

The centering mechanism 44 is not limited to this embodiment. For example, it is possible to use an elastic body made of resin that expands in the radial direction of the disc substrates when supplied with a fluid such as air or liquid.

In the above embodiment, an emission mechanism 45 is described in which light emitting diodes are arranged in a location corresponding to the internal circumference of the disc substrates. However, the emission mechanism 45 may have light emitting diodes arranged over a surface area corresponding to the whole surface of the disc substrates, light emitting diodes arranged in an annular pattern in the center, light emitting diodes arranged radially in one or more rows at 90° spacing or at 120° spacing, or the like. In any case, the emission mechanism 45 is installed in the disc mounting stage 43. The disc mounting stage 43 may move up and down as required.

The emission mechanism 45 is not limited to light emitting diodes. Semiconductor lasers, or an ultraviolet light radiating lamp such as a xenon lamp, a metal halide lamp, or the like may be used. In the case of semiconductor lasers, a plurality of semiconductor lasers arranged at equal spacing may be used instead of light emitting diodes. In the case of an ultraviolet light radiating lamp, a small sized, annular shaped one may be utilized.

Figure 25:
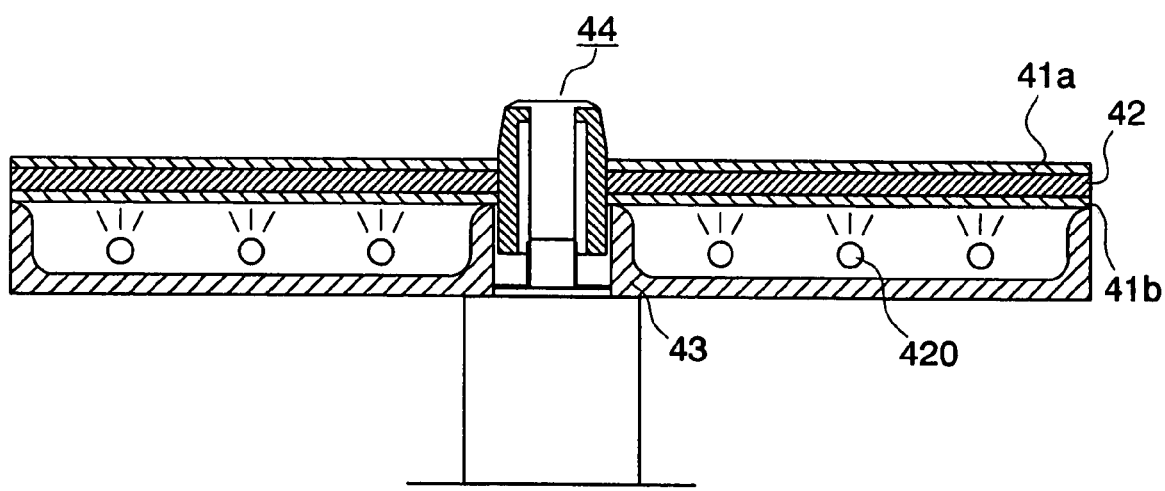
FIG. 25 is a sectional view to explain another example of a curing mechanism.

As another embodiment, an embodiment is shown in FIG. 25 in which ultraviolet light is radiated onto the whole surface of adhesive spread between disc substrates to cure it at the same time as centering is performed. In this case, as shown in FIG. 25, one or more annular shaped ultraviolet light radiating lamps 420, which are smaller than conventional ones, are provided inside a disc mounting stage 43, and the whole surface of adhesive 42 spread between the disc substrates is cured by irradiation from the ultraviolet light radiating lamps 420.

The ultraviolet light radiating lamps 420 are inside the disc mounting stage 43, whose inner diameter is almost the same as the outer diameter of the disc substrates 41a and 41b, the surface of the disc mounting stage 43 facing the disc substrates is open, or covered by heat-resistant glass, and its other surface is in a condition close to a mirror finished surface. As a result, ultraviolet light is radiated onto the disc substrates efficiently.

In order to shield against heat generated by the ultraviolet light radiating lamps 420, it is preferable to cool the disc mounting stage 43 and the ultraviolet light radiating lamps 420 by providing a cooling medium distribution path to supply air into the disc mounting stage 43.

In this embodiment, in order to cure the whole surface of the adhesive spread between the disc substrates at the same time as centering is performed, in a case where a process is required to cure the whole surface of the adhesive completely in a later process, since curing of the adhesive has started it is possible to cure it completely in a short time. Furthermore, miniaturization of an ultraviolet light curing apparatus can be achieved.

In this apparatus, since small sized, ultraviolet light radiating lamps are used, the amount of ultraviolet light radiation is smaller than that in a curing apparatus (for example, an ultraviolet light curing apparatus as shown in FIG. 24D) using normal ultraviolet light radiation. Accordingly, in order to cure the adhesive almost completely instead of only tacking, the arrangement may be such that a plurality of ultraviolet light irradiation mechanisms with a structure as shown in FIG. 25 is installed in a rotating transfer mechanism such as a turntable, so that the whole surface of the adhesive can be cured completely during a process of transferring to a predetermined location. Needless to say, the arrangement may also be such that a plurality of disc mounting stages is installed in which light emitting diodes are arranged on a surface area corresponding to the whole surface of the disc substrates, so that the whole surface of the adhesive can be cured completely.

Regarding disc substrates to be bonded, the effects of the present invention can be obtained even in a case where disc substrates have different thicknesses, for example, one disc substrate is a thin film.

What is claimed is:

1. An apparatus for bonding disc substrates comprising:
  a spinner which rotates a first and second disc substrate stacked via an adhesive at a high speed to spread said adhesive between said disc substrates;
  a disc mounting stage which is provided with a centering mechanism that is inserted into a center hole of the disc substrates for which said adhesive has been spread, to align the internal circumferences of said first and second disc substrates; and
  a disc substrate transfer mechanism which transfers said disc substrates from said spinner to said disc mounting stage;
  wherein said disc mounting stage is provided with an emission mechanism which radiates light onto the disc substrates whose internal circumferences are aligned to start curing the adhesive layer between said disc substrates, and
  said centering mechanism comprises;
  a shaft which moves up and down inside the center hole of said disc substrates,
  a drive mechanism which is connected to said shaft;
  an elastic body surrounding said shaft, which is put under pressure from above when said drive mechanism lowers said shaft, and expands in a radial direction of said disc substrates in order to press against the internal circumferences of said center holes of said first and second disc substrates; and
  a gap between the elastic body and a side face of the shaft, and
  said shaft comprises an umbrella section on a top of the shaft that is radially expanding from the shaft, and
  when the elastic body is pressed by the umbrella section of the shaft because the shaft is lowered, said elastic body expands in a radial direction of the first and second disc substrates while contracting in a central axis direction of center holes of the first and second disc substrates.

2. An apparatus for bonding disc substrates according to claim 1, wherein the emission mechanism semi-cures or cures the adhesive after the elastic body expands.

* * * * *